(12) United States Patent
Liao et al.

(10) Patent No.: US 10,241,295 B2
(45) Date of Patent: Mar. 26, 2019

(54) IMAGING LENS ASSEMBLY, IMAGE CAPTURING UNIT AND ELECTRONIC DEVICE

(71) Applicant: LARGAN Precision Co., Ltd., Taichung (TW)

(72) Inventors: Lin-Yao Liao, Taichung (TW); Hsin-Hsuan Huang, Taichung (TW)

(73) Assignee: LARGAN Precision Co., Ltd., Taichung (TW)

(*) Notice: Subject to any disclaimer, the term of this patent is extended or adjusted under 35 U.S.C. 154(b) by 0 days.

(21) Appl. No.: 15/666,274

(22) Filed: Aug. 1, 2017

(65) Prior Publication Data
US 2017/0357079 A1    Dec. 14, 2017

Related U.S. Application Data

(63) Continuation of application No. 14/952,234, filed on Nov. 25, 2015, now Pat. No. 9,753,249.

(30) Foreign Application Priority Data

Oct. 23, 2015   (TW) .............................. 104134906 A

(51) Int. Cl.
*G02B 9/60* (2006.01)
*G02B 9/62* (2006.01)
(Continued)

(52) U.S. Cl.
CPC ................ *G02B 9/60* (2013.01); *G02B 9/62* (2013.01); *G02B 13/006* (2013.01);
(Continued)

(58) Field of Classification Search
CPC ... G02B 9/60; G02B 9/62; G02B 9/64; G02B 13/0045; G02B 13/006; G02B 13/18; G02B 27/0025
(Continued)

(56) References Cited

U.S. PATENT DOCUMENTS 562,614 A    6/1896 Kaempfer
3,352,620 A  11/1967 Scidmore et al.
(Continued)

FOREIGN PATENT DOCUMENTS

CN    203930184 U    11/2014
CN    204256247 U     4/2015
(Continued)

OTHER PUBLICATIONS

United States Patent and Trademark Office, "Notice of Allowance," issued in connection with U.S. Appl. No. 14/952,234, dated May 8, 2017, 17 pages.
(Continued)

*Primary Examiner* — Jordan M Schwartz
(74) *Attorney, Agent, or Firm* — Hanley, Flight & Zimmerman, LLC

(57) ABSTRACT

A imaging lens assembly includes, in order from an object side to an image side, a first lens element, a second lens element, a third lens element, a fourth lens element, a fifth lens element and a sixth lens element. The first lens element has negative refractive power. The second lens element has positive refractive power. The third lens element has positive refractive power. The fourth lens element has positive refractive power. The fifth lens element has positive refractive power. The sixth lens element has negative refractive power. The imaging lens assembly has a total of six lens elements.

29 Claims, 27 Drawing Sheets

(51) Int. Cl.
*G02B 13/00* (2006.01)
*G02B 27/00* (2006.01)
*G02B 13/04* (2006.01)

(52) U.S. Cl.
CPC ......... *G02B 13/0045* (2013.01); *G02B 13/04* (2013.01); *G02B 27/0025* (2013.01)

(58) Field of Classification Search
USPC .................................................. 359/713, 714
See application file for complete search history.

(56) References Cited

U.S. PATENT DOCUMENTS

| | | | |
|---|---|---|---|
| 4,173,395 A * | 11/1979 | Kobayashi | ............ G02B 13/04 |
| | | | 359/750 |
| 5,039,212 A | 8/1991 | Kanoshima | |
| 6,377,404 B1 | 4/2002 | Goosey, Jr. | |
| 7,876,499 B1 | 1/2011 | Olczak | |
| 9,671,588 B2 | 6/2017 | Hsueh et al. | |
| 2012/0057251 A1 | 3/2012 | Takato | |
| 2015/0022905 A1 | 1/2015 | Shinohara et al. | |
| 2015/0098135 A1 | 4/2015 | Chung et al. | |
| 2015/0177484 A1 | 6/2015 | Hsu et al. | |
| 2015/0177485 A1 | 6/2015 | Hsu et al. | |
| 2015/0338614 A1 * | 11/2015 | Tang | ................. G02B 13/0045 |
| | | | 359/713 |
| 2016/0259150 A1 * | 9/2016 | Shin | ................... G02B 27/0025 |
| 2016/0377839 A1 * | 12/2016 | Chen | .................. G02B 13/0045 |
| | | | 359/708 |
| 2017/0115470 A1 | 4/2017 | Liao et al. | |
| 2017/0153449 A1 * | 6/2017 | Mori | ...................... B60R 1/081 |

FOREIGN PATENT DOCUMENTS

| | | |
|---|---|---|
| JP | H02230208 A | 9/1990 |
| JP | H06222263 A | 8/1994 |
| JP | H0718592 A | 5/1995 |
| JP | H11119098 A | 4/1999 |
| JP | 2010072622 A | 4/2010 |
| JP | 2013210534 A | 10/2013 |
| JP | 2014044250 A | 3/2014 |
| JP | 2014137540 A | 7/2014 |
| JP | 2015072405 A | 4/2015 |
| TW | 201426084 A | 7/2014 |
| TW | I491913 B | 7/2015 |
| WO | 2012169369 A1 | 12/2012 |

OTHER PUBLICATIONS

United States Patent and Trademark Office, "Non-Final Office Action," issued in connection with U.S. Appl. No. 14/952,234, dated Dec. 19, 2016, 25 pages.

* cited by examiner

IMAGING LENS ASSEMBLY, IMAGE CAPTURING UNIT AND ELECTRONIC DEVICE

RELATED APPLICATIONS

This application is a continuation patent application of U.S. application Ser. No. 14/952,234, filed Nov. 25, 2015, which claims priority to Taiwan Application 104134906, filed Oct. 23, 2015, which is incorporated by reference herein in its entirety.

BACKGROUND

Technical Field

The present disclosure relates to an imaging lens assembly, an image capturing unit and an electronic device, more particularly to an imaging lens assembly and an image capturing unit applicable to an electronic device.

Description of Related Art

With increasing widespread use of camera modules, camera modules adopted in electronic devices with intelligent applications, such as smart automobile devices, and smart home devices has fast becoming a trend of future technology development.

Through the recognition capability of lens assemblies installed in these camera modules, smart devices with these camera modules are now able to accomplish tasks which were only possible by humans in the past, such as image recognition, driving assistance systems, and autonomous vehicles, etc.

Additionally, by adjusting the various parameters and configurations in lens designs, these specialized lens assemblies can adapt to different environmental settings in order to provide a wider variety of unique applications. Therefore, there is a need for imaging lens assemblies capable of satisfying the requirements for camera modules with a wide variety of applications.

SUMMARY

According to one aspect of the present disclosure, an imaging lens assembly includes, in order from an object side to an image side, a first lens element, a second lens element, a third lens element, a fourth lens element, a fifth lens element and a sixth lens element. The first lens element has negative refractive power. The second lens element has positive refractive power. The third lens element has positive refractive power. The fourth lens element has positive refractive power. The fifth lens element has positive refractive power. The sixth lens element has negative refractive power. The imaging lens assembly has a total of six lens elements. When a ratio of a focal length of the imaging lens assembly to a focal length of the first lens element is P1, a ratio of the focal length of the imaging lens assembly to a focal length of the second lens element is P2, a ratio of the focal length of the imaging lens assembly to a focal length of the fifth lens element is P5, a ratio of the focal length of the imaging lens assembly to a focal length of the sixth lens element is P6, the following condition is satisfied:

$$(|P1|+|P2|)/(|P5|+|P6|)<0.60.$$

According to another aspect of the present disclosure, an imaging lens assembly includes, in order from an object side to an image side, a first lens element, a second lens element, a third lens element, a fourth lens element, a fifth lens element and a sixth lens element. The first lens element has negative refractive power. The second lens element has positive refractive power. The third lens element with positive refractive power has a concave image-side surface. The fourth lens element has positive refractive power. The fifth lens element with positive refractive power has a convex object-side surface and a convex image-side surface. The sixth lens element with negative refractive power has a concave image-side surface. The imaging lens assembly has a total of six lens elements. When a focal length of the imaging lens assembly is f, a curvature radius of the image-side surface of the sixth lens element is R12, the following condition is satisfied:

$$0<f/R12<3.0.$$

According to still another aspect of the present disclosure, an image capturing unit includes the aforementioned imaging lens assembly and an image sensor, wherein the image sensor is disposed on the image side of the imaging lens assembly.

According to yet still another aspect of the present disclosure, an electronic device includes the aforementioned image capturing unit.

BRIEF DESCRIPTION OF THE DRAWINGS

The disclosure can be more understood by reading the following detailed description of the embodiments, with reference made to the accompanying drawings as follows.

DETAILED DESCRIPTION

Figure 1:
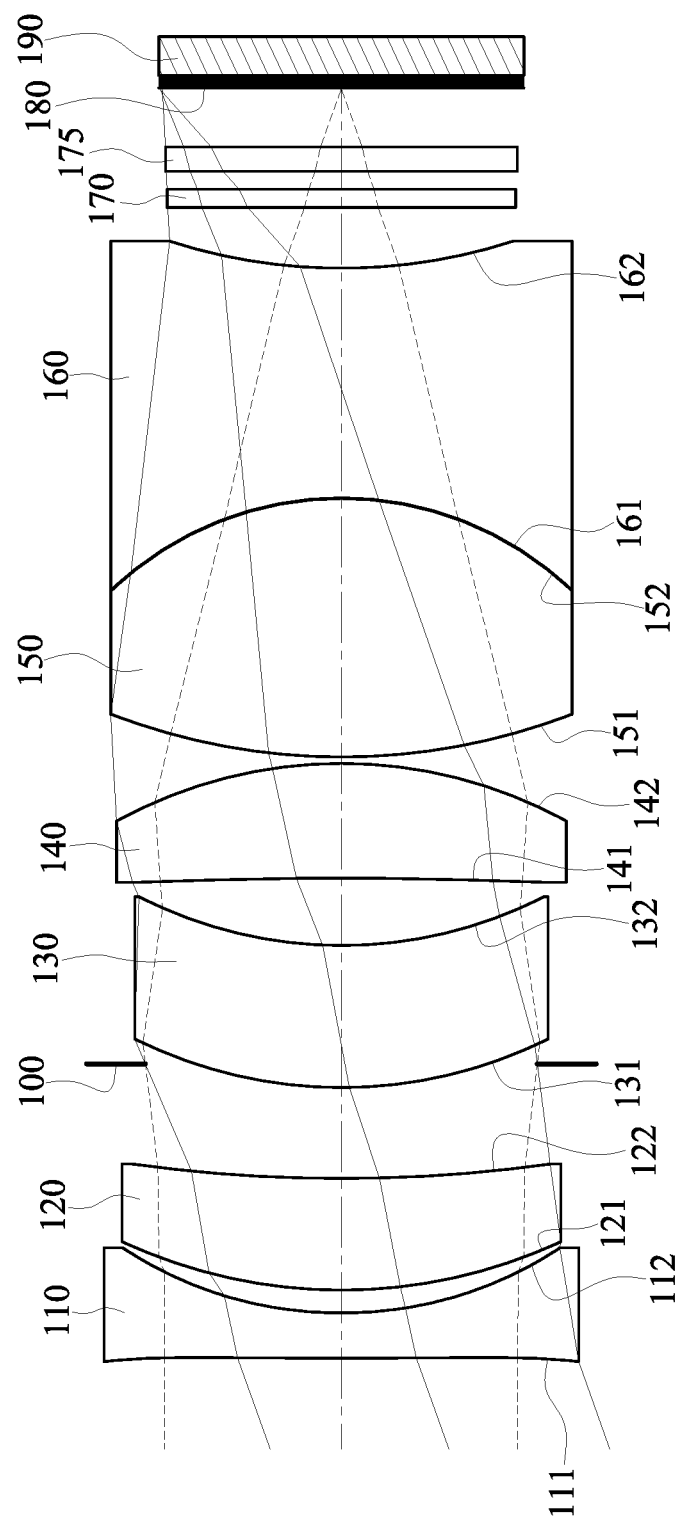
FIG. 1 is a schematic view of an image capturing unit according to the 1st embodiment of the present disclosure.

An imaging lens assembly includes, in order from an object side to an image side, a first lens element, a second lens element, a third lens element, a fourth lens element, a fifth lens element and a sixth lens element. The first lens element, the second lens element, the third lens element and the fourth lens element can be single and non-cemented lens elements. The fifth lens element and the sixth lens element can be cemented lens elements. The non-cemented lens element has the advantage of a simpler manufacturing process, and the cemented lens element is favorable for correcting aberrations.

The first lens element has negative refractive power. Therefore, it is favorable for enlarging the scope of the incident light beams so as to increase the aperture, and thereby providing sufficient amount of incident light.

The second lens element has positive refractive power. Therefore, it is favorable for balancing the divergence capability of the first lens element so as to correct aberrations generated from the first lens element.

The third lens element with positive refractive power can have a concave image-side surface. Therefore, it is favorable for reducing a total track length of the imaging lens assembly.

The fourth lens element has positive refractive power. Therefore, the arrangement of the refractive power of the third lens element and the fourth lens element is favorable for improving the convergence capability of the imaging lens assembly and balancing the refractive power distribution between the object side and the image side so as to correct aberrations of the imaging lens assembly. Furthermore, the fourth lens element can have a concave object-side surface and a convex image-side surface. Therefore, it is favorable for correcting aberrations of the off-axial region so as to reduce the difference of the focus positions due to different curvatures of the tangential plane and the sagittal plane.

The fifth lens element with positive refractive power can have a convex object-side surface and a convex image-side surface. Therefore, the arrangement of the second lens element and the fifth lens element, which is symmetrical within the structure of the imaging lens assembly, is favorable for enhancing the image quality.

The sixth lens element with negative refractive power can have a concave image-side surface. Therefore, it is favorable for correcting chromatic aberration so as to reduce the difference of the positions where different wavelengths of light are focused.

When a ratio of a focal length of the imaging lens assembly to a focal length of the first lens element is P1, a ratio of the focal length of the imaging lens assembly to a focal length of the second lens element is P2, a ratio of the focal length of the imaging lens assembly to a focal length of the fifth lens element is P5, a ratio of the focal length of the imaging lens assembly to a focal length of the sixth lens element is P6, the following condition is satisfied: $(|P1|+|P2|)/(|P5|+|P6|)<0.60$. Therefore, it is favorable for enlarging the aperture so as to increase the amount of incident light. Moreover, it is favorable for reducing a back focal length of the imaging lens assembly so as to maintain a compact size thereof. According to the disclosure, a ratio of the focal length of the imaging lens assembly to a focal length of a lens element is the refractive power of the lens element.

When the focal length of the imaging lens assembly is f, a curvature radius of the image-side surface of the sixth lens element is R12, the following condition is satisfied: $0<f/R12<3.0$. Therefore, it is favorable for further reducing the back focal length so as to keep the imaging lens assembly compact.

When an Abbe number of the sixth lens element is V6, the following condition can be satisfied: $V6<30$. Therefore, it is favorable for the imaging lens assembly having sufficient chromatic aberration correction capability at the image side so as to provide proper imaging range, and thereby the imaging lens assembly is favorably applicable to image recognition applications.

When an Abbe number of the first lens element is V1, an Abbe number of the second lens element is V2, an Abbe number of the third lens element is V3, an Abbe number of the fourth lens element is V4, an Abbe number of the fifth lens element is V5, and an Abbe number of the i-th lens element is Vi, the following condition can be satisfied: $30<Vi$, wherein i=1, 2, 3, 4, 5. Therefore, it is favorable for arranging the distribution of the refractive indices of the lens elements in the imaging lens assembly so as to prevent undesirable aberrations.

When the focal length of the imaging lens assembly is f, the following condition can be satisfied: 5.0 millimeters<f<15.0 millimeters. Therefore, it is favorable for keeping the imaging lens assembly compact.

According to the disclosure, the imaging lens assembly further includes an aperture stop, and the lens elements of the imaging lens assembly can include a front lens group and a rear lens group. The front lens group is located between an imaged object and the aperture stop, and the rear lens group is located between the aperture stop and an image surface. When a focal length of the front lens group is ff, a focal length of the rear lens group is fr, the following condition can be satisfied: $-0.50<fr/ff<0.50$. Therefore, it is favorable for balancing the refractive power distribution of the imaging lens assembly so as to reduce the total track length. According to the disclosure, both the front lens group and the rear lens group may include only one lens element or plural lens elements. When the front/rear lens group includes only one lens element, the focal length of the front/rear lens group is equal to a focal length of the lens element. When the front/rear lens group includes plural lens elements, the focal length of the front/rear lens group is equal to a composite focal length of the lens elements.

When the focal length of the imaging lens assembly is f, an entrance pupil diameter of the imaging lens assembly is EPD, the following condition can be satisfied: f/EPD<1.85. Therefore, it is favorable for arranging the aperture so as to provide sufficient amount of incident light, and thereby improving the image quality.

When an axial distance between an object-side surface of the first lens element and the image-side surface of the sixth lens element is Td, a maximum image height of the imaging lens assembly (half of a diagonal length of an effective photosensitive area of the image sensor) is ImgH, the following condition can be satisfied: 4.0<Td/ImgH<8.0. Therefore, it is favorable for tightly arranging the lens elements of the imaging lens assembly so as to maintain a compact size thereof.

When a curvature radius of an object-side surface of the third lens element is R5, a curvature radius of the image-side surface of the third lens element is R6, the following condition can be satisfied: −0.80<(R5−R6)/(R5+R6)<0.10. Therefore, it is favorable for correcting spherical aberration so as to improve the image quality.

When a curvature radius of the object-side surface of the fifth lens element is R9, a curvature radius of the image-side surface of the fifth lens element is R10, a curvature radius of an object-side surface of the sixth lens element is R11, the curvature radius of the image-side surface of the sixth lens element is R12, the following condition can be satisfied: −0.50<((R9+R10)/(R9−R10))+((R11+R12)/(R11−R12)) <0.50. Therefore, the shapes of the lens elements at the image side of the imaging lens assembly are symmetric so that it is favorable for correcting coma and astigmatism.

When an axial distance between the first lens element and the second lens element is T12, an axial distance between the third lens element and the fourth lens element is T34, the following condition can be satisfied: 0.10<T12/T34<1.5. Therefore, the axial distances between adjacent lens elements are properly arranged so that it is favorable for obtaining compactness and assembling the image lens assembly.

When the entrance pupil diameter of the imaging lens assembly is EPD, the maximum image height of the imaging lens assembly is ImgH, the following condition can be satisfied: 0.65<EPD/ImgH<3.0. Therefore, when the imaging lens assembly has a sufficient photosensitive area, it is favorable for per unit of the photosensitive area receiving more light so as to increase the image illumination and resolution.

When half of a maximal field of view of the imaging lens assembly is HFOV, the following condition can be satisfied: 0.40<tan(2*HFOV)<1.0. Therefore, it is favorable for obtaining a proper field of view so that the imaging lens assembly is applicable to image recognition functionality on various devices.

When a sum of central thicknesses of all the lens elements of the imaging lens assembly (That is, a sum of the central thicknesses of the first lens element, the second lens element, the third lens element, the fourth lens element, the fifth lens element and the sixth lens element) is ΣCT, the axial distance between the object-side surface of the first lens element and the image-side surface of the sixth lens element is Td, the following condition can be satisfied: 0.60<ΣCT/Td<1.0. Therefore, it is favorable for assembling the lens elements with a proper arrangement so as to increase the manufacturing yield rate and keep the imaging lens assembly compact.

When a refractive index of the first lens element is N1, a refractive index of the second lens element is N2, a maximum refractive index among all the lens elements of the imaging lens assembly (That is, a maximum refractive index among the first lens element, the second lens element, the third lens element, the fourth lens element, the fifth lens element and the sixth lens element) is Nmax, the following conditions can be satisfied: N1<N2 and 1.7<Nmax. Therefore, it is favorable for properly distributing the refractive indices of the lens elements while choosing a proper material for each lens element.

When a maximum effective radius of the object-side surface of the first lens element is Y11, a maximum effective radius of the image-side surface of the sixth lens element is Y62, the following condition can be satisfied: 0.80<Y11/Y62<1.55. Therefore, it is favorable for controlling the size difference between an entrance opening and an exit opening of the imaging lens assembly so as to increase the amount of incident light and provide the proper image size.

When an axial distance between the object-side surface of the first lens element and the image surface is TL, the focal length of the imaging lens assembly is f, the following condition can be satisfied: 1.8<TL/f<7.0. Therefore, it is favorable for balancing the configuration of the imaging lens assembly with a sufficient imaging range and incident light so as to obtain higher image quality.

When the central thickness of the first lens element is CT1, the central thickness of the second lens element is CT2, the central thickness of the third lens element is CT3, the central thickness of the fourth lens element is CT4, the central thickness of the fifth lens element is CT5, the central thickness of the sixth lens element is CT6, the following condition can be satisfied: 0.65<(CT5+CT6)/(CT1+CT2+CT3+CT4). Therefore, it is favorable for properly arranging the thicknesses of the fifth lens element and the sixth lens element so as to correct high-order aberrations, and thereby improving the image quality.

According to the present disclosure, an aperture stop can be configured as a front stop or a middle stop. A front stop disposed between an imaged object and the first lens element can produce a telecentric effect by providing a longer distance between an exit pupil and the image surface, thereby improving the image-sensing efficiency of an image sensor (for example, CCD or CMOS). A middle stop disposed between the first lens element and the image surface is favorable for enlarging the view angle and thereby provides a wider field of view.

According to the present disclosure, the lens elements of the imaging lens assembly can be made of glass or plastic material. When the lens elements are made of glass material, the refractive power distribution of the imaging lens assembly may be more flexible to design. When the lens elements are made of plastic material, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof and to further decrease the required number of the lens elements. Therefore, the total track length of the imaging lens assembly can also be reduced.

According to the present disclosure, each of an object-side surface and an image-side surface has a paraxial region and an off-axial region. The paraxial region refers to the region of the surface where light rays travel close to the optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. Moreover, when a region of refractive power or focus of a lens element is not defined, it indicates that the region of refractive power or focus of the lens element can be in the paraxial region thereof.

According to the present disclosure, an image surface of the imaging lens assembly, based on the corresponding image sensor, can be flat or curved, particularly a concave curved surface facing towards the object side of the imaging lens assembly.

According to the present disclosure, the imaging lens assembly can include at least one stop, such as an aperture stop, a glare stop or a field stop. Said glare stop or said field stop is allocated for eliminating the stray light and thereby improving the image quality thereof.

According to the present disclosure, an image capturing unit is provided. The image capturing unit includes the imaging lens assembly according to the aforementioned imaging lens assembly of the present disclosure, and an image sensor, wherein the image sensor is disposed on the image side of the aforementioned imaging lens assembly, that is, the image sensor can be disposed on or near an image surface of the aforementioned imaging lens assembly. In some embodiments, the image capturing unit can further include a barrel member, a holding member or a combination thereof.

Figure 25:
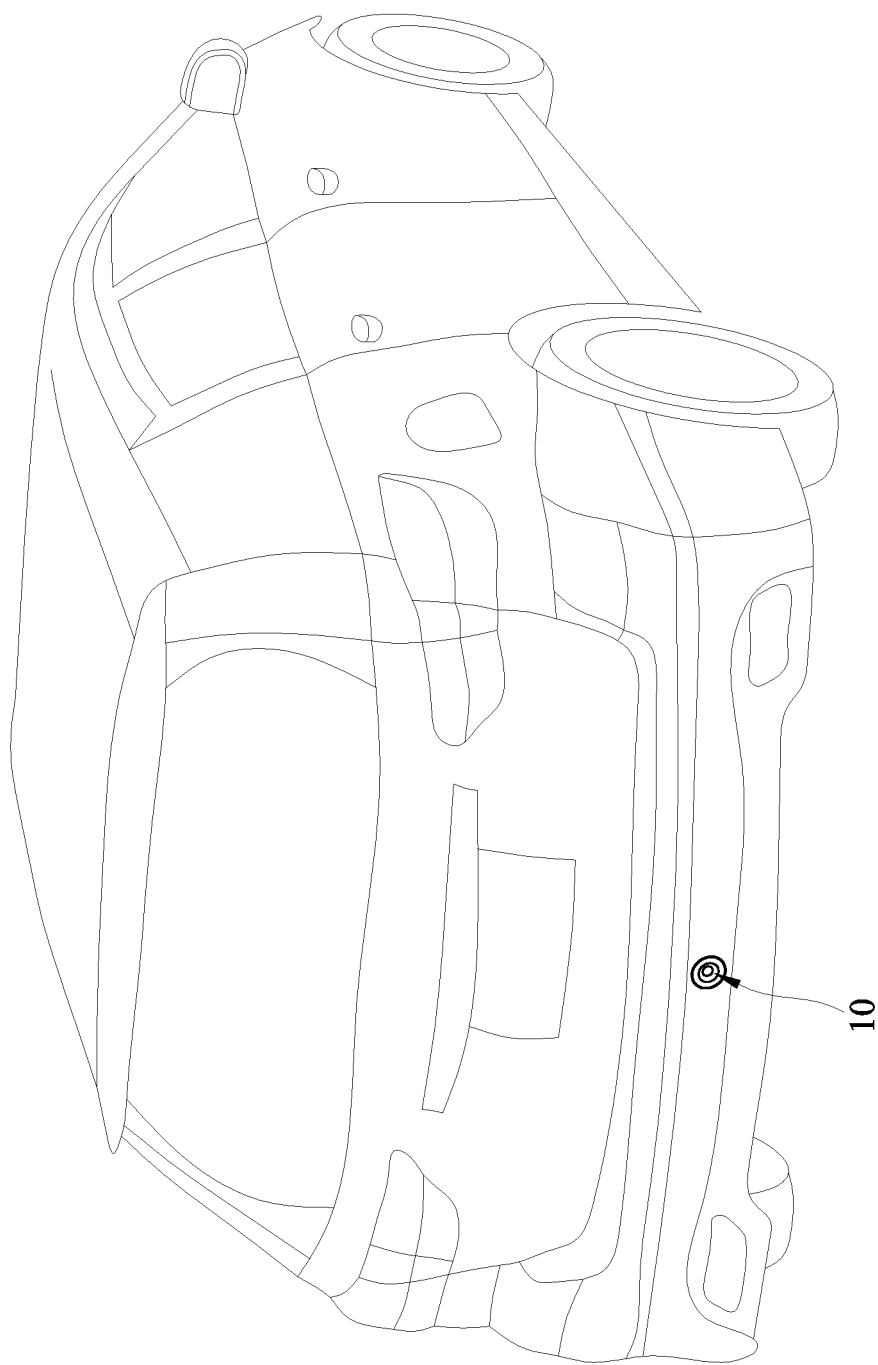
FIG. 25 shows an electronic device according to one embodiment.
Figure 26:
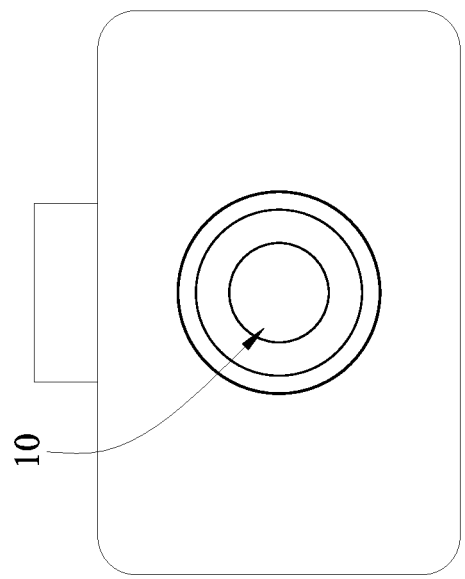
FIG. 26 shows an electronic device according to another embodiment.
Figure 27:
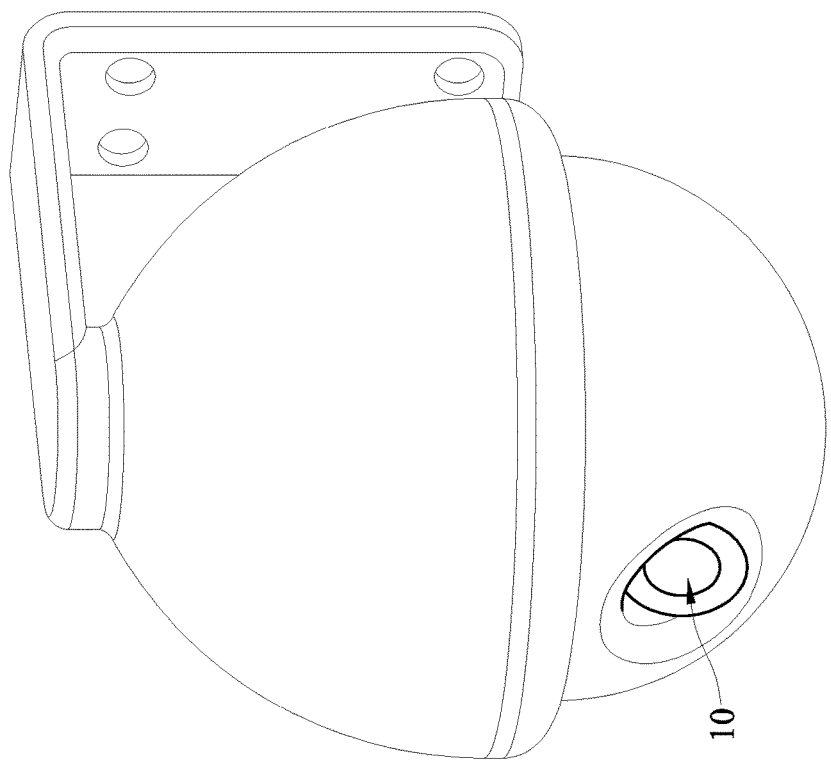
FIG. 27 shows an electronic device according to still another embodiment.

In FIG. 25, FIG. 26, and FIG. 27, an image capturing unit 10 may be installed in, but not limited to, an electronic device, including a vehicle backup camera (FIG. 25), a dashboard camera (FIG. 26) or a surveillance device (FIG. 27). The electronic devices shown in the figures are only exemplary for showing the image capturing unit of the present disclosure installed in an electronic device and are not limited thereto. In some embodiments, the electronic device can further include, but not limited to, a display unit, a control unit, a storage unit, a random access memory unit (RAM), a read only memory unit (ROM) or a combination thereof.

According to the present disclosure, the imaging lens assembly can be optionally applied to optical systems with a movable focus. Furthermore, the imaging lens assembly is featured with good capability in aberration corrections and high image quality, and can be applied to 3D (three-dimensional) image capturing applications, in products such as digital cameras, mobile devices, digital tablets, wearable devices, smart televisions, network surveillance devices, motion sensing input devices, dashboard cameras, vehicle backup cameras and other electronic imaging devices. Moreover, the imaging lens assembly also can be applied to driving assistance, in products such as lane departure warning system (LDWS), autonomous vehicle and other image recognition devices. According to the above description of the present disclosure, the following specific embodiments are provided for further explanation.

1st Embodiment

Figure 2:
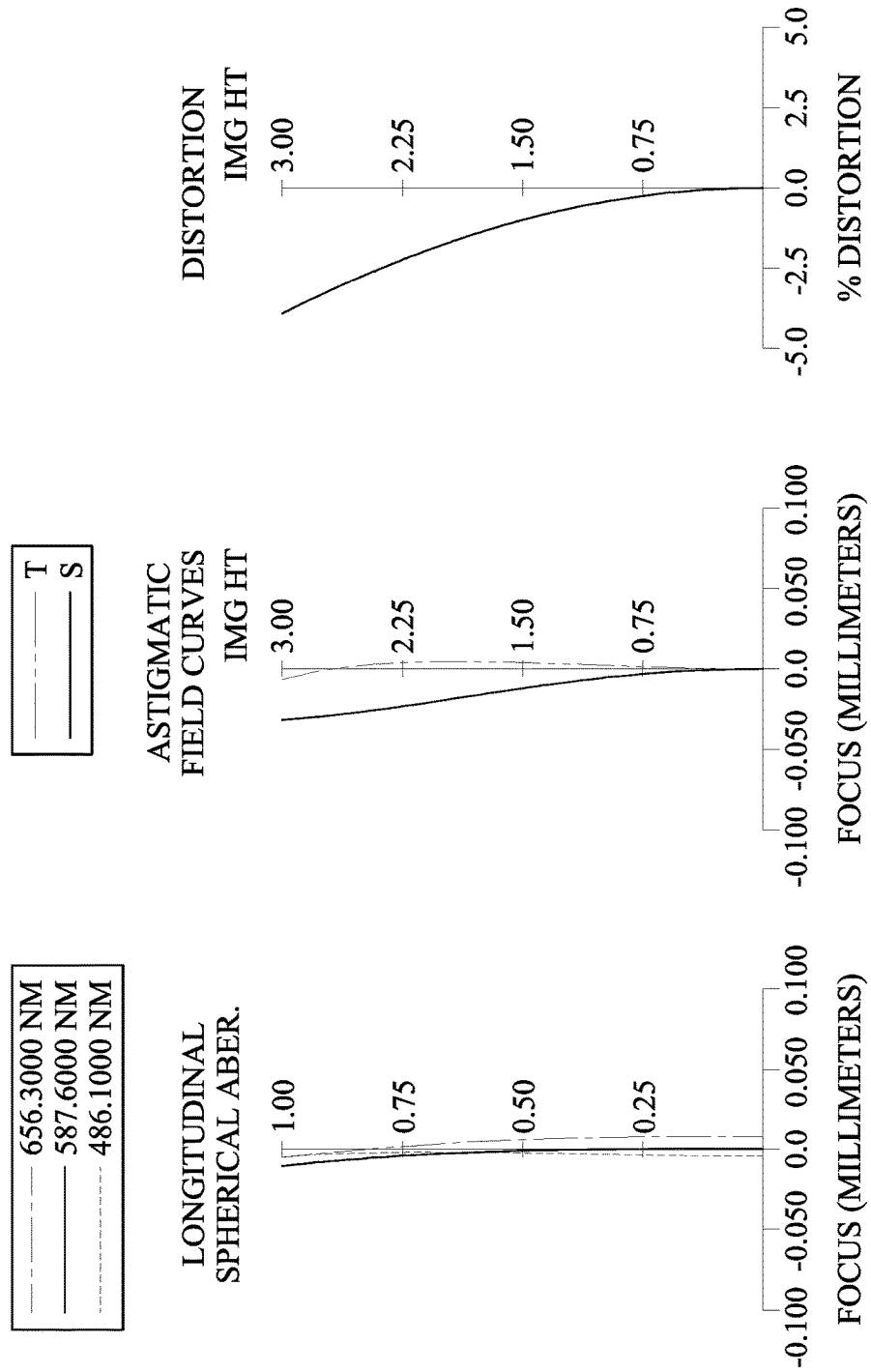
FIG. 2 shows spherical aberration curves, astigmatic field curves and a distortion curve of the image capturing unit according to the 1st embodiment.

FIG. 1 is a schematic view of an image capturing unit according to the 1st embodiment of the present disclosure. FIG. 2 shows, in order from left to right, spherical aberration curves, astigmatic field curves and a distortion curve of the image capturing unit according to the 1st embodiment. In FIG. 1, the image capturing unit includes the imaging lens assembly (its reference numeral is omitted) of the present disclosure and an image sensor 190. The imaging lens assembly includes, in order from an object side to an image side, a first lens element 110, a second lens element 120, an aperture stop 100, a third lens element 130, a fourth lens element 140, a fifth lens element 150, a sixth lens element 160, an IR-cut filter 170, a cover glass 175 and an image surface 180, wherein the imaging lens assembly has a total of six lens elements (110-160). The first lens element 110, the second lens element 120, the third lens element 130 and the fourth lens element 140 are single and non-cemented lens elements. The fifth lens element 150 and the sixth lens element 160 are cemented lens elements.

The first lens element 110 with negative refractive power has a convex object-side surface 111 and a concave image-side surface 112. The first lens element 110 is made of glass material and has the object-side surface 111 and the image-side surface 112 being both aspheric.

The second lens element 120 with positive refractive power has a convex object-side surface 121 and a concave image-side surface 122. The second lens element 120 is made of glass material and has the object-side surface 121 and the image-side surface 122 being both spherical.

The third lens element 130 with positive refractive power has a convex object-side surface 131 and a concave image-side surface 132. The third lens element 130 is made of glass material and has the object-side surface 131 and the image-side surface 132 being both spherical.

The fourth lens element 140 with positive refractive power has a concave object-side surface 141 and a convex image-side surface 142. The fourth lens element 140 is made of glass material and has the object-side surface 141 and the image-side surface 142 being both spherical.

The fifth lens element 150 with positive refractive power has a convex object-side surface 151 and a convex image-side surface 152. The fifth lens element 150 is made of glass material and has the object-side surface 151 and the image-side surface 152 being both spherical.

The sixth lens element 160 with negative refractive power has a concave object-side surface 161 and a concave image-side surface 162. The sixth lens element 160 is made of glass material and has the object-side surface 161 and the image-side surface 162 being both spherical.

The IR-cut filter 170 and the cover glass 175 are made of glass material and located between the sixth lens element 160 and the image surface 180 and will not affect the focal length of the imaging lens assembly. The image sensor 190 is disposed on or near the image surface 180 of the imaging lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from an optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient, and in the embodiments, i may be, but is not limited to, 4, 6, 8, 10, 12, 14 and 16.

In the imaging lens assembly of the image capturing unit according to the 1st embodiment, when a focal length of the imaging lens assembly is f, an f-number of the imaging lens assembly is Fno, and half of a maximal field of view of the imaging lens assembly is HFOV, these parameters have the following values: f=8.74 millimeters (mm), Fno=1.50; and HFOV=19.7 degrees (deg.).

When an Abbe number of the first lens element 110 is V1, an Abbe number of the second lens element 120 is V2, an Abbe number of the third lens element 130 is V3, an Abbe number of the fourth lens element 140 is V4, an Abbe number of the fifth lens element 150 is V5, an Abbe number of the sixth lens element 160 is V6, the following conditions are satisfied: V1=38.0; V2=42.2; V3=46.6; V4=52.3; V5=40.9; and V6=23.8.

When a maximum refractive index among all the lens elements (110-160) of the imaging lens assembly is Nmax, the following condition is satisfied: Nmax=1.847. In this embodiment, the refractive index of the sixth lens element 160 is the largest among the refractive indices of the lens elements (110-160) of the imaging lens assembly, and therefore is equal to Nmax.

When an axial distance between the first lens element 110 and the second lens element 120 is T12, an axial distance between the third lens element 130 and the fourth lens element 140 is T34, the following condition is satisfied: T12/T34=0.34.

When a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, the following condition is satisfied: (CT5+CT6)/(CT1+CT2+CT3+CT4)=1.18.

When a curvature radius of the object-side surface 131 of the third lens element 130 is R5, a curvature radius of the image-side surface 132 of the third lens element 130 is R6, the following condition is satisfied: (R5−R6)/(R5+R6)=0.02.

When the focal length of the imaging lens assembly is f, a curvature radius of the image-side surface 162 of the sixth lens element 160 is R12, the following condition is satisfied: f/R12=0.94.

When a curvature radius of the object-side surface 151 of the fifth lens element 150 is R9, a curvature radius of the image-side surface 152 of the fifth lens element 150 is R10, a curvature radius of the object-side surface 161 of the sixth lens element 160 is R11, the curvature radius of the image-side surface 162 of the sixth lens element 160 is R12, the following condition is satisfied: ((R9+R10)/(R9−R10))+((R11+R12)/(R11−R12))=0.06.

When a ratio of the focal length of the imaging lens assembly to a focal length of the first lens element 110 (the refractive power of the first lens element 110) is P1, a ratio of the focal length of the imaging lens assembly to a focal length of the second lens element 120 (the refractive power of the second lens element 120) is P2, a ratio of the focal length of the imaging lens assembly to a focal length of the fifth lens element 150 (the refractive power of the fifth lens element 150) is P5, a ratio of the focal length of the imaging lens assembly to a focal length of the sixth lens element 160 (the refractive power of the sixth lens element 160) is P6, the following condition is satisfied: (|P1|+|P2|)/(|P5|+|P6|)=0.32.

When a maximum effective radius of the object-side surface 111 of the first lens element 110 is Y11, a maximum effective radius of the image-side surface 162 of the sixth lens element 160 is Y62, the following condition is satisfied: Y11/Y62=1.38.

When the focal length of the imaging lens assembly is f, an entrance pupil diameter of the imaging lens assembly is EPD, the following condition is satisfied: f/EPD=1.50.

The first lens element 110 and the second lens element 120 which are located between an imaged object and the aperture stop 100 are a front lens group of the imaging lens assembly. The third lens element 130, the fourth lens element 140, the fifth lens element 150 and the sixth lens element 160 which are located between the aperture stop 100 and the image surface 180 are a rear lens group of the imaging lens assembly. When a focal length of front lens group is ff, a focal length of the rear lens group is fr, the following condition is satisfied: fr/ff=−0.16. In this embodiment, ff is equal to a composite focal length of the first lens element 110 and the second lens element 120, and fr is equal to a composite focal length of the third lens element 130, the fourth lens element 140, the fifth lens element 150 and the sixth lens element 160.

When an axial distance between the object-side surface 111 of the first lens element 110 and the image surface 180 is TL, the focal length of the imaging lens assembly is f, the following condition is satisfied: TL/f=2.40.

When a sum of the central thicknesses of all the lens elements (110-160) of the imaging lens assembly is ΣCT, an axial distance between the object-side surface 111 of the first lens element 110 and the image-side surface 162 of the sixth lens element 160 is Td, the following condition is satisfied: ΣCT/Td=0.83.

When the axial distance between the object-side surface 111 of the first lens element 110 and the image-side surface 162 of the sixth lens element 160 is Td, a maximum image height of the imaging lens assembly is ImgH, the following condition is satisfied: Td/ImgH=6.01.

When the entrance pupil diameter of the imaging lens assembly is EPD, the maximum image height of the imaging lens assembly is ImgH, the following condition is satisfied: EPD/ImgH=1.94.

When half of the maximal field of view of the imaging lens assembly is HFOV, the following condition is satisfied: tan(2*HFOV)=0.82.

The detailed optical data of the 1st embodiment are shown in Table 1 and the aspheric surface data are shown in Table 2 below.

TABLE 1

1st Embodiment
f = 8.74 mm, Fno = 1.50, HFOV = 19.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 163.934 | (ASP) | 0.750 | Glass | 1.603 | 38.0 | −11.88 |
| 2 | | 6.857 | (ASP) | 0.379 | | | | |
| 3 | Lens 2 | 8.582 | | 1.843 | Glass | 1.800 | 42.2 | 15.55 |
| 4 | | 25.051 | | 1.895 | | | | |
| 5 | Ape. Stop | Plano | | −0.392 | | | | |
| 6 | Lens 3 | 7.635 | | 2.346 | Glass | 1.816 | 46.6 | 91.00 |
| 7 | | 7.335 | | 1.115 | | | | |
| 8 | Lens 4 | −87.675 | | 1.899 | Glass | 1.755 | 52.3 | 11.08 |
| 9 | | −7.707 | | 0.100 | | | | |
| 10 | Lens 5 | 10.574 | | 4.279 | Glass | 1.806 | 40.9 | 5.09 |
| 11 | | −5.501 | | 0.010 | Cement | 1.514 | 38.8 | |
| 12 | Lens 6 | −5.499 | | 3.800 | Glass | 1.847 | 23.8 | −3.65 |
| 13 | | 9.274 | | 1.000 | | | | |
| 14 | IR-cut filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 0.979 | | | | |
| 18 | Image | Plano | | — | | | | |

Note:
Reference wavelength is 587.6 nm (d-line).

TABLE 2

Aspheric Coefficients

| | Surface # | |
|---|---|---|
| | 1 | 2 |
| k = | 2.5000E+01 | 3.7464E−01 |
| A4 = | −9.6626E−05 | 3.2339E−04 |
| A6 = | −2.1707E−05 | −1.9065E−05 |

In Table 1, the curvature radius, the thickness and the focal length are shown in millimeters (mm). Surface numbers 0-18 represent the surfaces sequentially arranged from the object side to the image side along the optical axis.

In Table 2, k represents the conic coefficient of the equation of the aspheric surface profiles. A4-A6 represent the aspheric coefficients ranging from the 4th order to the 6th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
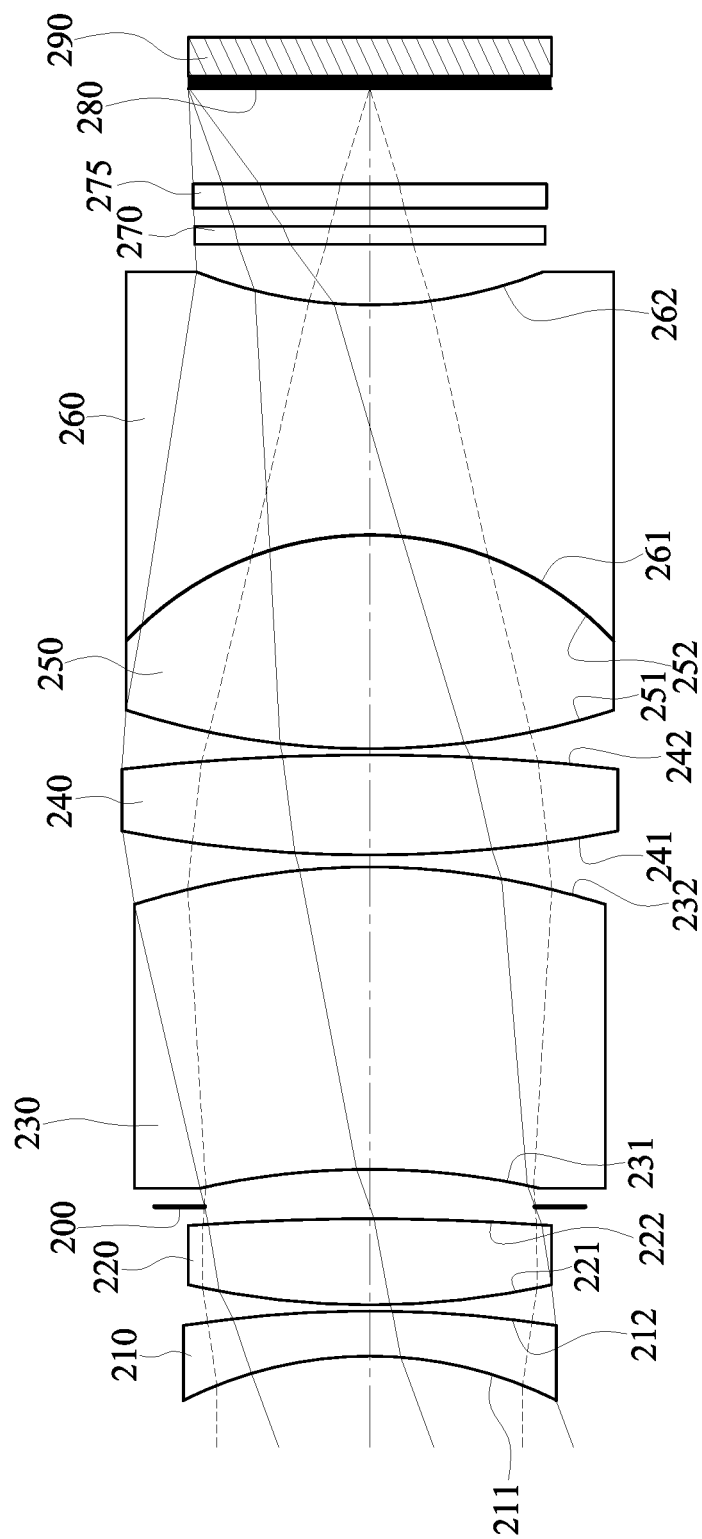
FIG. 3 is a schematic view of an image capturing unit according to the 2nd embodiment of the present disclosure.
Figure 4:
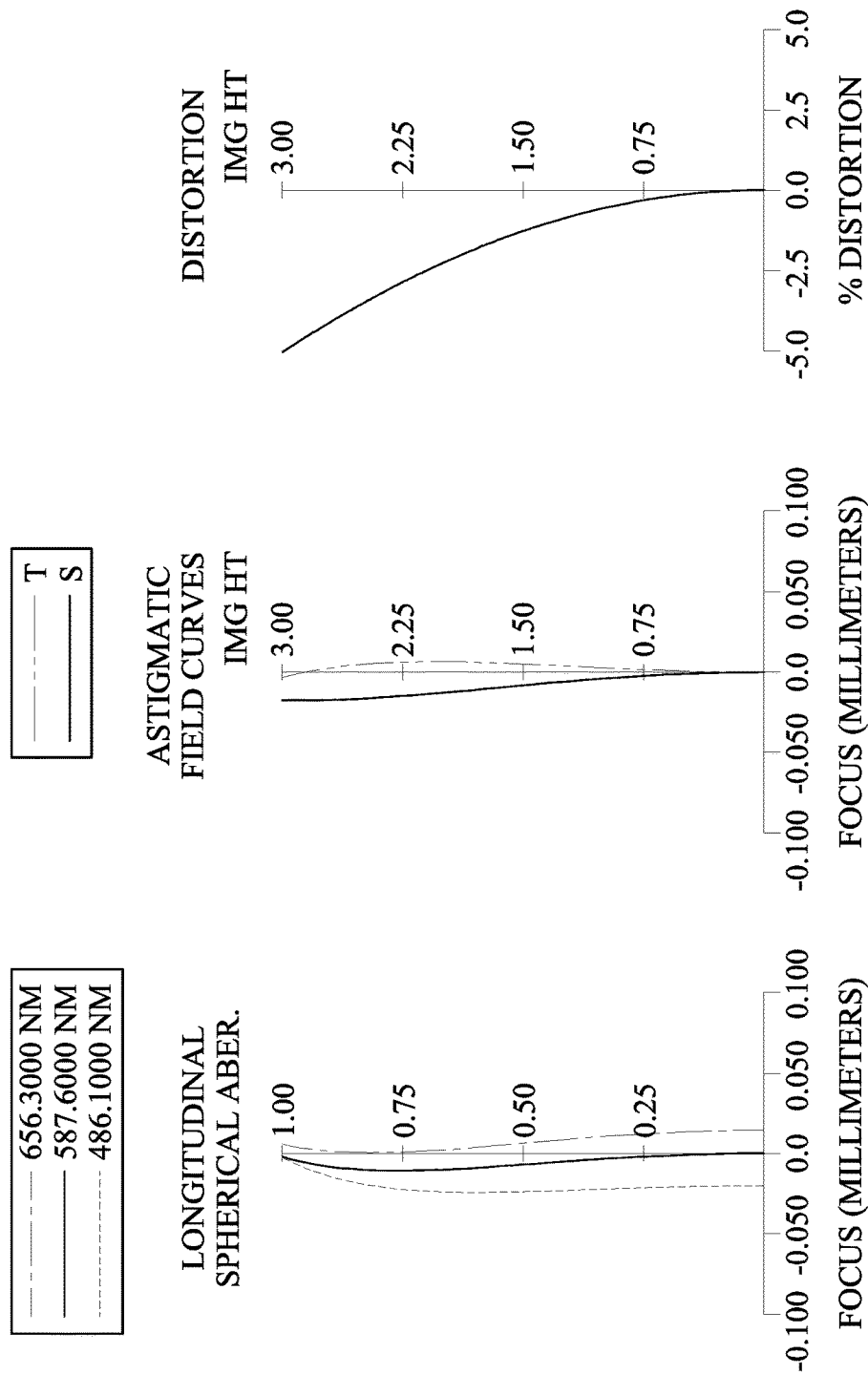
FIG. 4 shows spherical aberration curves, astigmatic field curves and a distortion curve of the image capturing unit according to the 2nd embodiment.

FIG. 3 is a schematic view of an image capturing unit according to the 2nd embodiment of the present disclosure. FIG. 4 shows, in order from left to right, spherical aberration curves, astigmatic field curves and a distortion curve of the image capturing unit according to the 2nd embodiment. In FIG. 3, the image capturing unit includes the imaging lens assembly (its reference numeral is omitted) of the present disclosure and an image sensor 290. The imaging lens assembly includes, in order from an object side to an image side, a first lens element 210, a second lens element 220, an aperture stop 200, a third lens element 230, a fourth lens element 240, a fifth lens element 250, a sixth lens element 260, an IR-cut filter 270, a cover glass 275 and an image surface 280, wherein the imaging lens assembly has a total of six lens elements (210-260). The first lens element 210, the second lens element 220, the third lens element 230 and the fourth lens element 240 are single and non-cemented lens elements. The fifth lens element 250 and the sixth lens element 260 are cemented lens elements.

The first lens element 210 with negative refractive power has a concave object-side surface 211 and a convex image-side surface 212. The first lens element 210 is made of glass material and has the object-side surface 211 and the image-side surface 212 being both spherical.

The second lens element 220 with positive refractive power has a convex object-side surface 221 and a convex image-side surface 222. The second lens element 220 is made of glass material and has the object-side surface 221 and the image-side surface 222 being both spherical.

The third lens element 230 with positive refractive power has a concave object-side surface 231 and a convex image-side surface 232. The third lens element 230 is made of glass material and has the object-side surface 231 and the image-side surface 232 being both aspheric.

The fourth lens element 240 with positive refractive power has a convex object-side surface 241 and a convex image-side surface 242. The fourth lens element 240 is made of glass material and has the object-side surface 241 and the image-side surface 242 being both spherical.

The fifth lens element 250 with positive refractive power has a convex object-side surface 251 and a convex image-side surface 252. The fifth lens element 250 is made of glass material and has the object-side surface 251 and the image-side surface 252 being both spherical.

The sixth lens element 260 with negative refractive power has a concave object-side surface 261 and a concave image-side surface 262. The sixth lens element 260 is made of glass material and has the object-side surface 261 and the image-side surface 262 being both spherical.

The IR-cut filter 270 and the cover glass 275 are made of glass material and located between the sixth lens element 260 and the image surface 280, and will not affect the focal length of the imaging lens assembly. The image sensor 290 is disposed on or near the image surface 280 of the imaging lens assembly.

The detailed optical data of the 2nd embodiment are shown in Table 3 and the aspheric surface data are shown in Table 4 below.

TABLE 3

2nd Embodiment
f = 8.58 mm, Fno = 1.70, HFOV = 20.2 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | -6.842 | 0.750 | Glass | 1.603 | 38.0 | -17.65 |
| 2 | | -19.922 | 0.100 | | | | |
| 3 | Lens 2 | 13.634 | 1.429 | Glass | 1.800 | 42.2 | 12.77 |
| 4 | | -38.766 | 0.198 | | | | |
| 5 | Ape. Stop | Plano | 0.615 | | | | |
| 6 | Lens 3 | -12.943 (ASP) | 5.000 | Glass | 1.847 | 23.8 | 56.94 |
| 7 | | -12.011 (ASP) | 0.200 | | | | |
| 8 | Lens 4 | 21.398 | 1.653 | Glass | 1.741 | 52.6 | 18.34 |
| 9 | | -36.036 | 0.100 | | | | |
| 10 | Lens 5 | 12.976 | 3.529 | Glass | 1.806 | 40.9 | 5.24 |
| 11 | | -5.501 | 0.010 | Cement | 1.514 | 38.8 | |
| 12 | Lens 6 | -5.499 | 3.800 | Glass | 1.847 | 23.8 | -3.36 |
| 13 | | 7.779 | 1.000 | | | | |
| 14 | IR-cut filter | Plano | 0.300 | Glass | 1.517 | 64.2 | — |
| 15 | | Plano | 0.300 | | | | |
| 16 | Cover glass | Plano | 0.400 | Glass | 1.517 | 64.2 | — |
| 17 | | Plano | 1.579 | | | | |
| 18 | Image | Plano | — | | | | |

Note:
Reference wavelength is 587.6 nm (d-line).

TABLE 4

Aspheric Coefficients

| | Surface # | |
|---|---|---|
| | 6 | 7 |
| k = | 1.0004E+00 | -1.7157E+00 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 8.58 | (CT5 + CT6)/(CT1 + CT2 + CT3 + CT4) | 0.83 |
| Fno | 1.70 | (R5 - R6)/(R5 + R6) | 0.04 |
| HFOV [deg.] | 20.2 | ((R9 + R10)/(R9 - R10)) + ((R11 + R12)/(R11 - R12)) | 0.23 |
| V1 | 38.0 | (|P1| + |P2|)/(|P5| + |P6|) | 0.28 |
| V2 | 42.2 | Y11/Y62 | 1.08 |
| V3 | 23.8 | f/EPD | 1.70 |
| V4 | 52.6 | fr/ff | 0.30 |
| V5 | 40.9 | TL/f | 2.44 |
| V6 | 23.8 | ΣCT/Td | 0.93 |
| Nmax | 1.847 | Td/ImgH | 5.79 |
| T12/T34 | 0.50 | EPD/ImgH | 1.68 |
| f/R12 | 1.10 | tan(2*HFOV) | 0.85 |

3rd Embodiment

Figure 5:
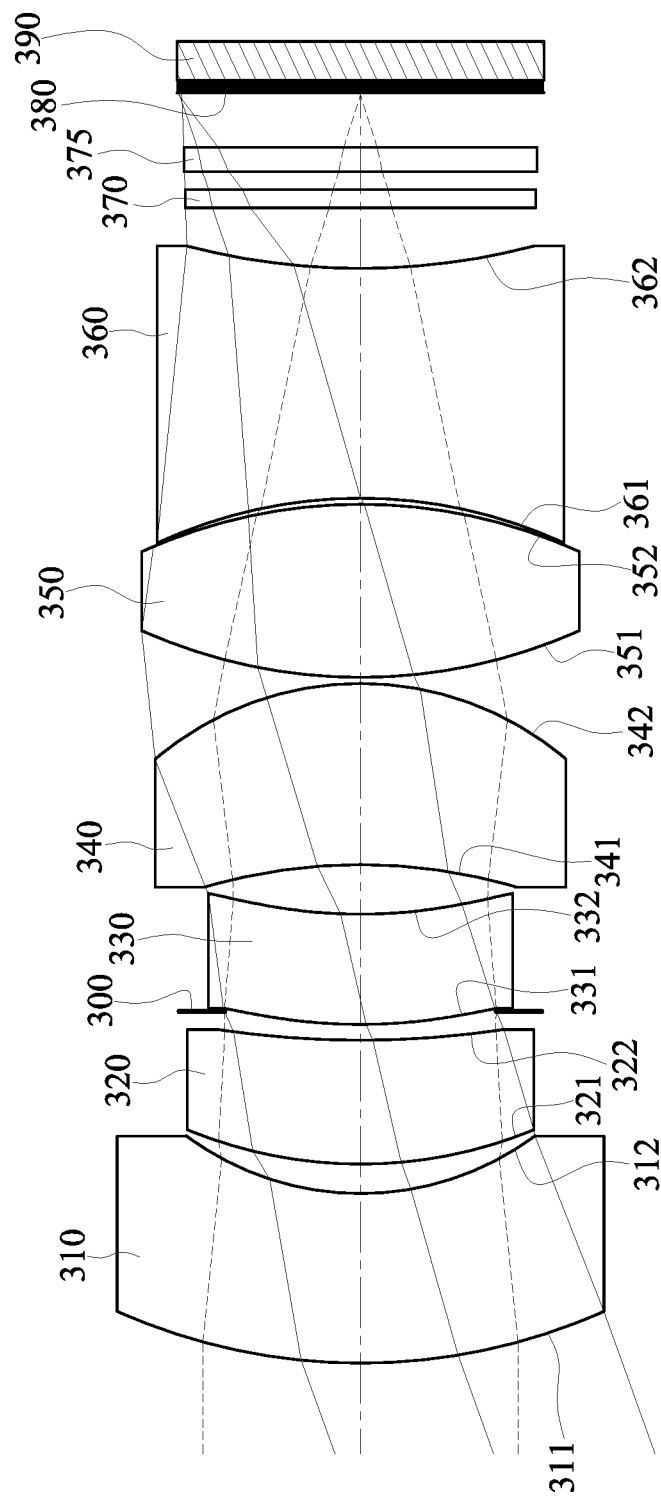
FIG. 5 is a schematic view of an image capturing unit according to the 3rd embodiment of the present disclosure.
Figure 6:
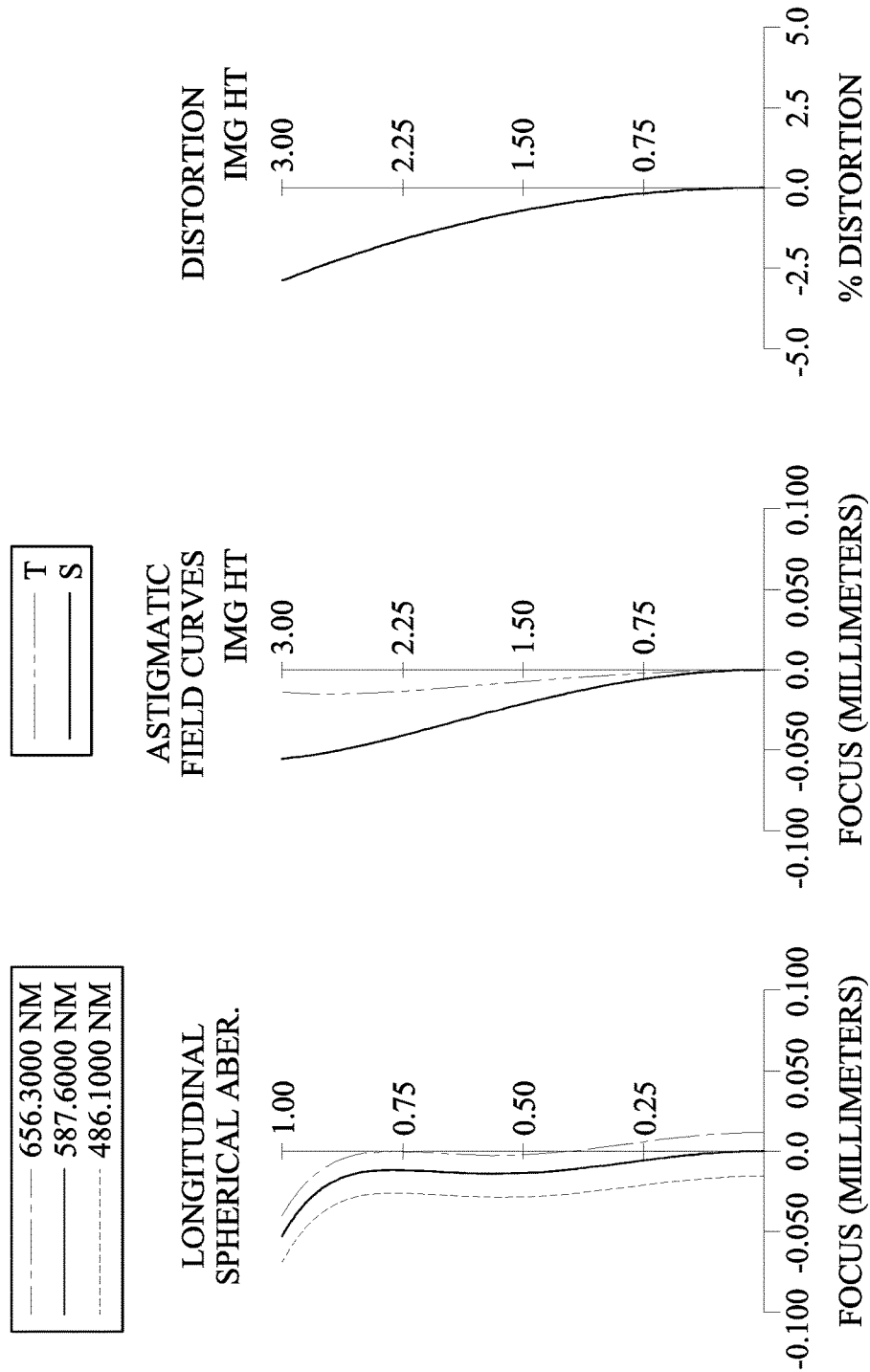
FIG. 6 shows spherical aberration curves, astigmatic field curves and a distortion curve of the image capturing unit according to the 3rd embodiment.

FIG. 5 is a schematic view of an image capturing unit according to the 3rd embodiment of the present disclosure. FIG. 6 shows, in order from left to right, spherical aberration curves, astigmatic field curves and a distortion curve of the image capturing unit according to the 3rd embodiment. In FIG. 5, the image capturing unit includes the imaging lens assembly (its reference numeral is omitted) of the present disclosure and an image sensor 390. The imaging lens assembly includes, in order from an object side to an image side, a first lens element 310, a second lens element 320, an aperture stop 300, a third lens element 330, a fourth lens element 340, a fifth lens element 350, a sixth lens element 360, an IR-cut filter 370, a cover glass 375 and an image surface 380, wherein the imaging lens assembly has a total of six lens elements (310-360). The first lens element 310, the second lens element 320, the third lens element 330 and the fourth lens element 340 are single and non-cemented lens elements. The fifth lens element 350 and the sixth lens element 360 are cemented lens elements.

The first lens element 310 with negative refractive power has a convex object-side surface 311 and a concave image-side surface 312. The first lens element 310 is made of glass material and has the object-side surface 311 and the image-side surface 312 being both spherical.

The second lens element 320 with positive refractive power has a convex object-side surface 321 and a concave image-side surface 322. The second lens element 320 is made of glass material and has the object-side surface 321 and the image-side surface 322 being both spherical.

The third lens element 330 with positive refractive power has a convex object-side surface 331 and a concave image-side surface 332. The third lens element 330 is made of glass material and has the object-side surface 331 and the image-side surface 332 being both aspheric.

The fourth lens element 340 with positive refractive power has a concave object-side surface 341 and a convex image-side surface 342. The fourth lens element 340 is made of glass material and has the object-side surface 341 and the image-side surface 342 being both spherical.

The fifth lens element 350 with positive refractive power has a convex object-side surface 351 and a convex image-side surface 352. The fifth lens element 350 is made of glass material and has the object-side surface 351 and the image-side surface 352 being both spherical.

The sixth lens element 360 with negative refractive power has a concave object-side surface 361 and a concave image-side surface 362. The sixth lens element 360 is made of glass material and has the object-side surface 361 and the image-side surface 362 being both spherical.

The IR-cut filter 370 and the cover glass 375 are made of glass material and located between the sixth lens element 360 and the image surface 380, and will not affect the focal length of the imaging lens assembly. The image sensor 390 is disposed on or near the image surface 380 of the imaging lens assembly.

The detailed optical data of the 3rd embodiment are shown in Table 5 and the aspheric surface data are shown in Table 6 below.

TABLE 5

3rd Embodiment
f = 8.59 mm, Fno = 1.65, HFOV = 19.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 9.862 | 2.799 | Glass | 1.603 | 38.0 | −19.79 |
| 2 | | 4.824 | 0.495 | | | | |
| 3 | Lens 2 | 7.481 | 2.042 | Glass | 1.804 | 46.6 | 16.03 |
| 4 | | 15.665 | 0.481 | | | | |
| 5 | Ape. Stop | Plano | −0.216 | | | | |
| 6 | Lens 3 | 8.548 (ASP) | 1.823 | Glass | 1.804 | 46.6 | 163.00 |
| 7 | | 8.276 (ASP) | 0.816 | | | | |
| 8 | Lens 4 | −9.085 | 2.994 | Glass | 1.741 | 52.6 | 12.47 |
| 9 | | −5.223 | 0.100 | | | | |
| 10 | Lens 5 | 8.829 | 2.866 | Glass | 1.804 | 46.6 | 5.88 |
| 11 | | −8.718 | 0.100 | Cement | 1.514 | 38.8 | |
| 12 | Lens 6 | −7.971 | 3.800 | Glass | 1.847 | 23.8 | −5.04 |
| 13 | | 11.205 | 1.000 | | | | |
| 14 | IR-cut filter | Plano | 0.300 | Glass | 1.517 | 64.2 | — |
| 15 | | Plano | 0.300 | | | | |
| 16 | Cover glass | Plano | 0.400 | Glass | 1.517 | 64.2 | — |
| 17 | | Plano | 0.906 | | | | |
| 18 | Image | Plano | — | | | | |

Note:
Reference wavelength is 587.6 nm (d-line).

TABLE 6

Aspheric Coefficients

| Surface # | | |
|---|---|---|
| | 6 | 7 |
| k = | −1.7591E+00 | −1.2811E+00 |
| A4 = | −3.1055E−04 | 5.8563E−05 |
| A6 = | −1.3925E−04 | −1.3857E−04 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 8.58 | (CT5 + CT6)/(CT1 + CT2 + CT3 + CT4) | 0.69 |
| Fno | 1.65 | (R5 − R6)/(R5 + R6) | 0.02 |
| HFOV [deg.] | 19.8 | ((R9 + R10)/(R9 − R10)) + ((R11 + R12)/(R11 − R12)) | −0.16 |
| V1 | 38.0 | (|P1| + |P2|)/(|P5| + |P6|) | 0.31 |
| V2 | 46.6 | Y11/Y62 | 1.40 |
| V3 | 46.6 | f/EPD | 1.65 |
| V4 | 52.6 | fr/ff | 0.03 |
| V5 | 46.6 | TL/f | 2.45 |
| V6 | 23.8 | ΣCT/Td | 0.90 |
| Nmax | 1.847 | Td/ImgH | 6.03 |
| T12/T34 | 0.61 | EPD/ImgH | 1.73 |
| f/R12 | 0.77 | tan(2*HFOV) | 0.83 |

4th Embodiment

Figure 7:
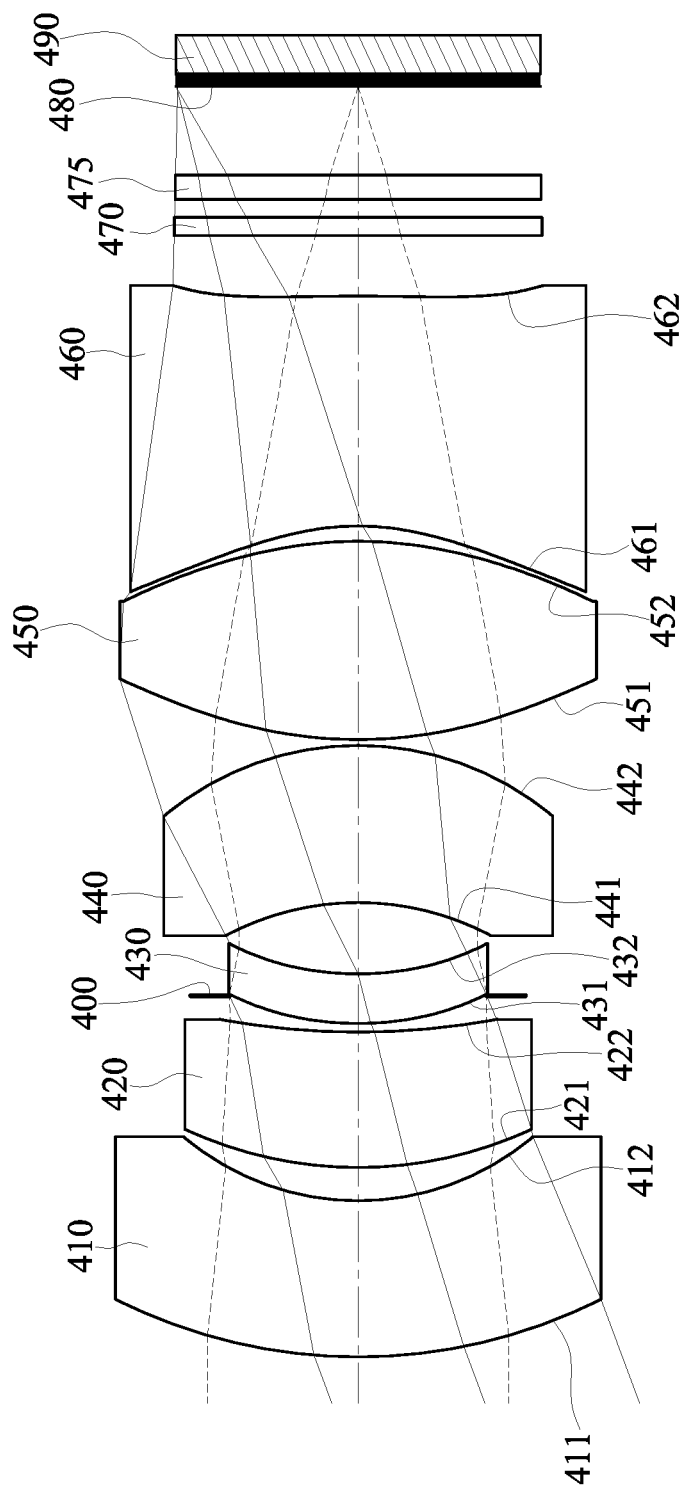
FIG. 7 is a schematic view of an image capturing unit according to the 4th embodiment of the present disclosure.
Figure 8:
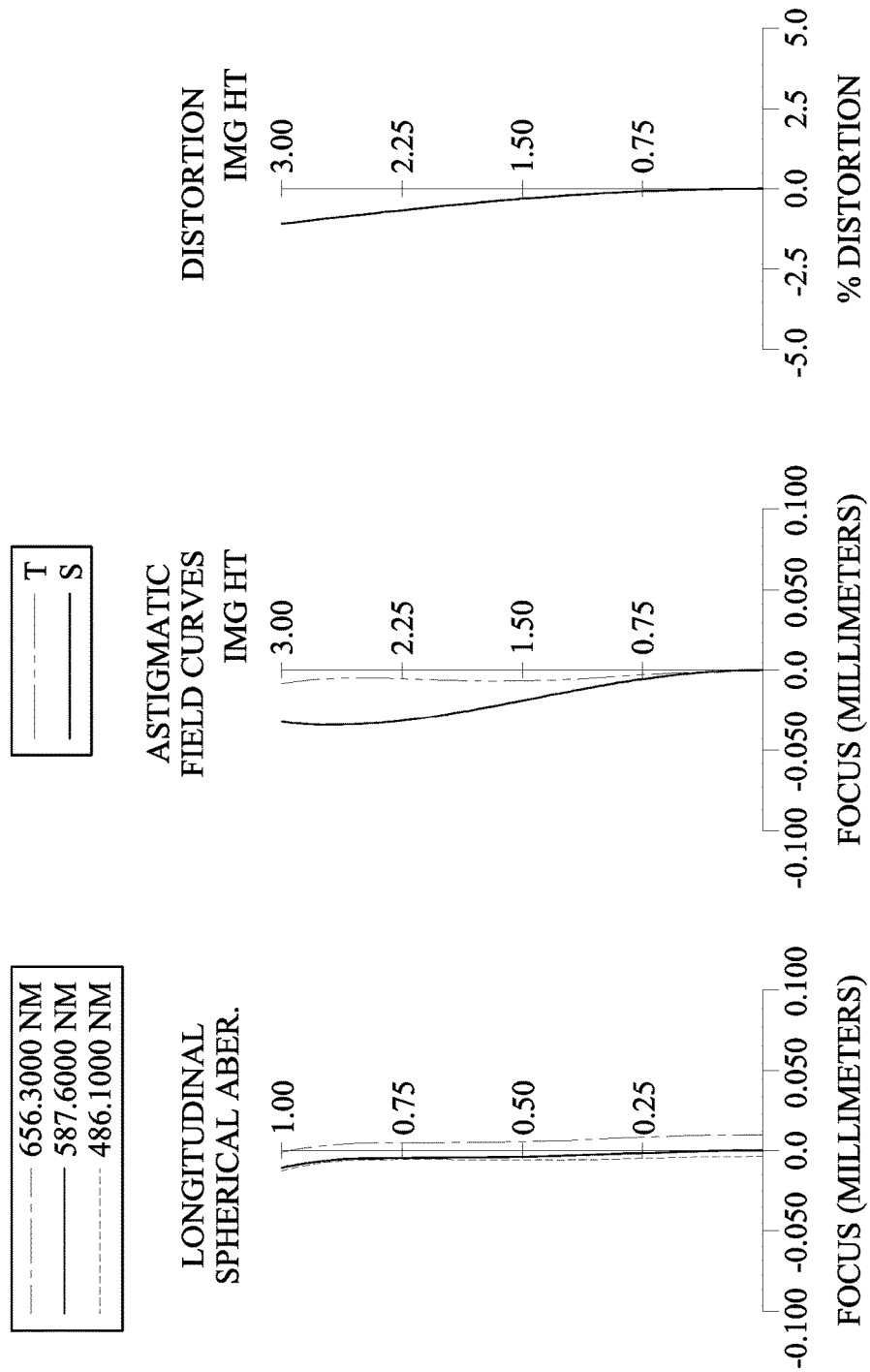
FIG. 8 shows spherical aberration curves, astigmatic field curves and a distortion curve of the image capturing unit according to the 4th embodiment.

FIG. 7 is a schematic view of an image capturing unit according to the 4th embodiment of the present disclosure. FIG. 8 shows, in order from left to right, spherical aberration curves, astigmatic field curves and a distortion curve of the image capturing unit according to the 4th embodiment. In FIG. 7, the image capturing unit includes the imaging lens assembly (its reference numeral is omitted) of the present disclosure and an image sensor 490. The imaging lens assembly includes, in order from an object side to an image side, a first lens element 410, a second lens element 420, an aperture stop 400, a third lens element 430, a fourth lens element 440, a fifth lens element 450, a sixth lens element 460, an IR-cut filter 470, a cover glass 475 and an image surface 480, wherein the imaging lens assembly has a total of six single and non-cemented lens elements (410-460).

The first lens element 410 with negative refractive power has a convex object-side surface 411 and a concave image-side surface 412. The first lens element 410 is made of glass material and has the object-side surface 411 and the image-side surface 412 being both spherical.

The second lens element 420 with positive refractive power has a convex object-side surface 421 and a concave image-side surface 422. The second lens element 420 is made of glass material and has the object-side surface 421 and the image-side surface 422 being both spherical.

The third lens element 430 with positive refractive power has a convex object-side surface 431 and a concave image-side surface 432. The third lens element 430 is made of glass material and has the object-side surface 431 and the image-side surface 432 being both aspheric.

The fourth lens element 440 with positive refractive power has a concave object-side surface 441 and a convex image-side surface 442. The fourth lens element 440 is made of glass material and has the object-side surface 441 and the image-side surface 442 being both spherical.

The fifth lens element 450 with positive refractive power has a convex object-side surface 451 and a convex image-side surface 452. The fifth lens element 450 is made of glass material and has the object-side surface 451 and the image-side surface 452 being both aspheric.

The sixth lens element 460 with negative refractive power has a concave object-side surface 461 and a convex image-side surface 462. The sixth lens element 460 is made of plastic material and has the object-side surface 461 and the image-side surface 462 being both aspheric.

The IR-cut filter 470 and the cover glass 475 are made of glass material and located between the sixth lens element 460 and the image surface 480, and will not affect the focal length of the imaging lens assembly. The image sensor 490 is disposed on or near the image surface 480 of the imaging lens assembly.

The detailed optical data of the 4th embodiment are shown in Table 7 and the aspheric surface data are shown in Table 8 below.

TABLE 7

4th Embodiment
f = 8.21 mm, Fno = 1.65, HFOV = 20.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.900 | | 2.580 | Glass | 1.603 | 38.0 | −18.98 |
| 2 | | 4.461 | | 0.552 | | | | |
| 3 | Lens 2 | 6.795 | | 2.231 | Glass | 1.804 | 46.6 | 15.85 |
| 4 | | 12.428 | | 0.611 | | | | |
| 5 | Ape. Stop | Plano | | −0.461 | | | | |
| 6 | Lens 3 | 5.080 | (ASP) | 0.820 | Glass | 1.804 | 46.6 | 113.83 |
| 7 | | 4.991 | (ASP) | 1.175 | | | | |
| 8 | Lens 4 | −4.656 | | 2.600 | Glass | 1.741 | 52.6 | 40.66 |
| 9 | | −4.991 | | 0.100 | | | | |
| 10 | Lens 5 | 7.255 | (ASP) | 3.278 | Glass | 1.804 | 46.6 | 4.87 |
| 11 | | −6.801 | (ASP) | 0.253 | | | | |
| 12 | Lens 6 | −4.309 | (ASP) | 3.800 | Plastic | 1.660 | 20.4 | −7.81 |
| 13 | | −35.466 | (ASP) | 1.000 | | | | |
| 14 | IR-cut filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 1.465 | | | | |
| 18 | Image | Plano | | — | | | | — |

Note:
Reference wavelength is 587.6 nm (d-line).

TABLE 8

Aspheric Coefficients

| | Surface # | | |
|---|---|---|---|
| | 6 | 7 | 10 |
| k = | −4.6982E−01 | 4.9412E−01 | −1.1841E+00 |
| A4 = | 8.6744E−04 | −2.0451E−04 | −2.3287E−05 |
| A6 = | 1.5344E−04 | 2.2357E−04 | −1.2097E−05 |

TABLE 8-continued

Aspheric Coefficients

| | Surface # | | |
|---|---|---|---|
| | 11 | 12 | 13 |
| k = | −2.7054E+00 | −3.0583E+00 | 1.7345E+00 |
| A4 = | 2.4485E−04 | 1.4356E−03 | 3.5885E−03 |
| A6 = | −1.9518E−05 | −4.0032E−05 | −4.1211E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| | | 4th Embodiment | |
|---|---|---|---|
| f [mm] | 8.21 | (CT5 + CT6)/(CT1 + CT2 + CT3 + CT4) | 0.86 |
| Fno | 1.65 | (R5 − R6)/(R5 + R6) | 0.01 |
| HFOV [deg.] | 20.3 | ((R9 + R10)/(R9 − R10)) + ((R11 + R12)/(R11 − R12)) | −1.24 |
| V1 | 38.0 | (|P1| + |P2|)/(|P5| + |P6|) | 0.35 |
| V2 | 46.6 | Y11/Y62 | 1.31 |

-continued

| | | 4th Embodiment | |
|---|---|---|---|
| V3 | 46.6 | f/EPD | 1.65 |
| V4 | 52.6 | fr/ff | 0.01 |
| V5 | 46.6 | TL/f | 2.56 |
| V6 | 20.4 | ΣCT/Td | 0.87 |
| Nmax | 1.804 | Td/ImgH | 5.85 |
| T12/T34 | 0.47 | EPD/ImgH | 1.66 |
| f/R12 | −0.23 | tan(2*HFOV) | 0.86 |

5th Embodiment

Figure 9:
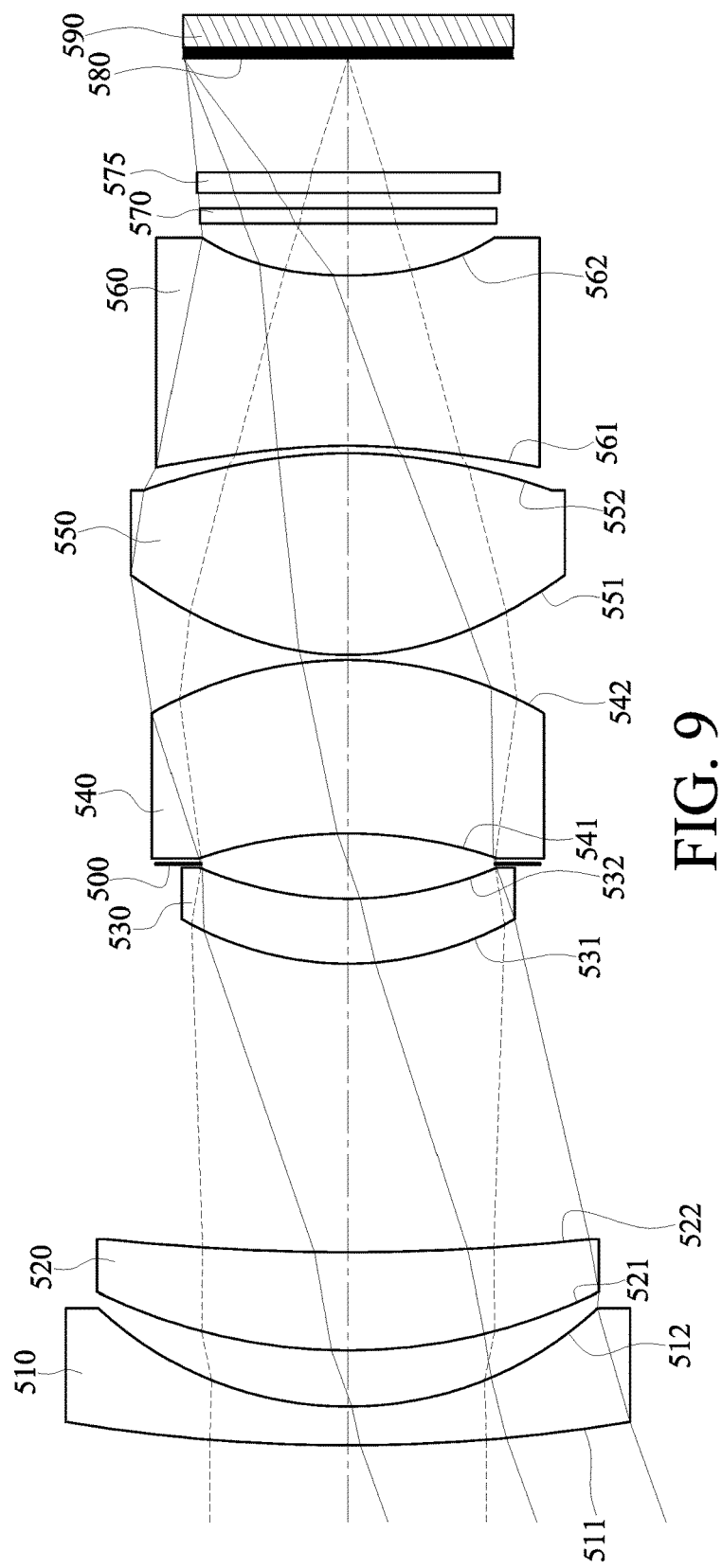
FIG. 9 is a schematic view of an image capturing unit according to the 5th embodiment of the present disclosure.
Figure 10:
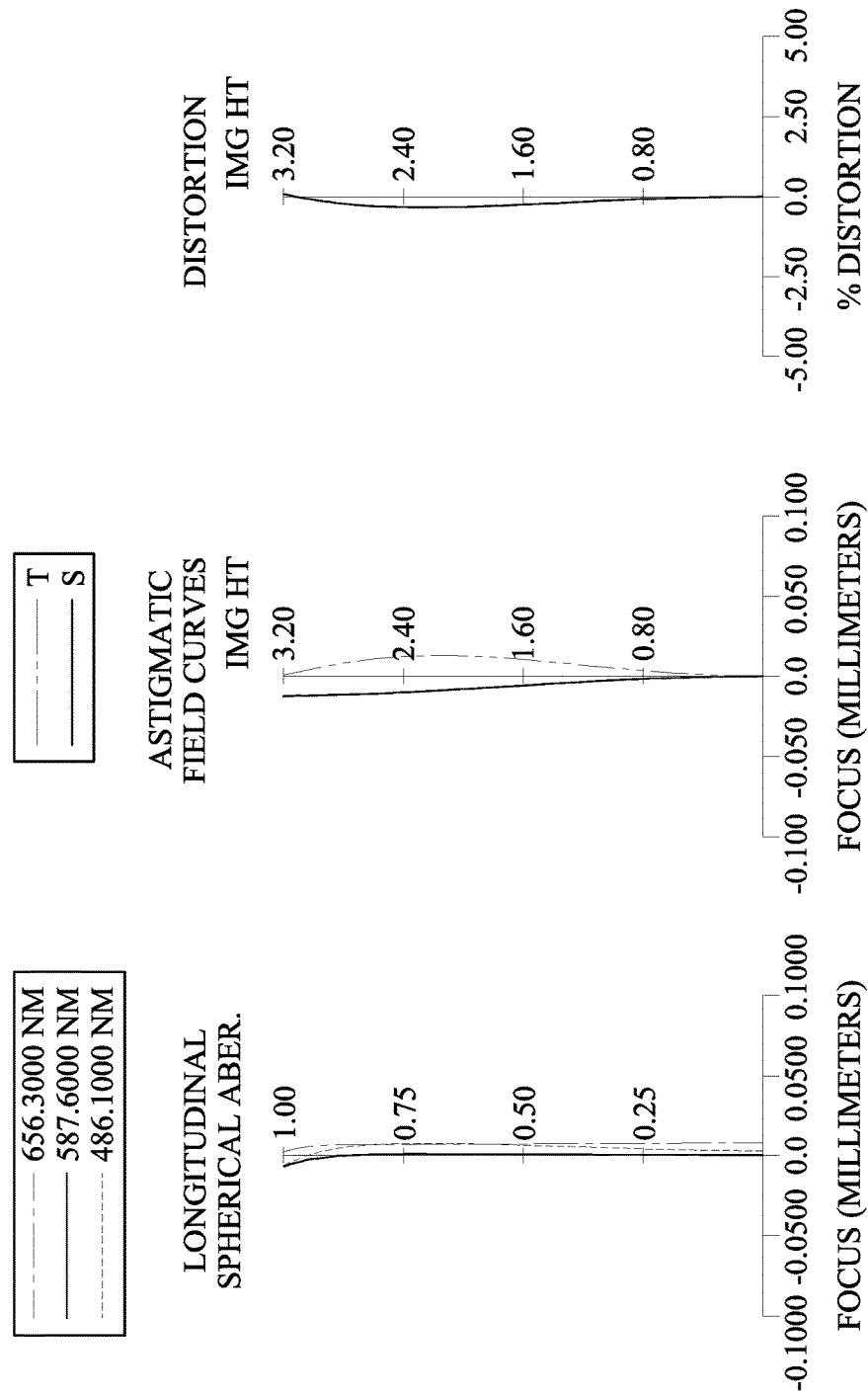
FIG. 10 shows spherical aberration curves, astigmatic field curves and a distortion curve of the image capturing unit according to the 5th embodiment.

FIG. 9 is a schematic view of an image capturing unit according to the 5th embodiment of the present disclosure. FIG. 10 shows, in order from left to right, spherical aberration curves, astigmatic field curves and a distortion curve of the image capturing unit according to the 5th embodiment. In FIG. 9, the image capturing unit includes the imaging lens assembly (its reference numeral is omitted) of the present disclosure and an image sensor 590. The imaging lens assembly includes, in order from an object side to an image side, a first lens element 510, a second lens element 520, a third lens element 530, an aperture stop 500, a fourth lens element 540, a fifth lens element 550, a sixth lens element 560, an IR-cut filter 570, a cover glass 575 and an image surface 580, wherein the imaging lens assembly has a total of six single and non-cemented lens elements (510-560).

The first lens element 510 with negative refractive power has a convex object-side surface 511 and a concave image-side surface 512. The first lens element 510 is made of glass material and has the object-side surface 511 and the image-side surface 512 being both spherical.

The second lens element 520 with positive refractive power has a convex object-side surface 521 and a concave image-side surface 522. The second lens element 520 is made of glass material and has the object-side surface 521 and the image-side surface 522 being both spherical.

The third lens element 530 with positive refractive power has a convex object-side surface 531 and a concave image-side surface 532. The third lens element 530 is made of plastic material and has the object-side surface 531 and the image-side surface 532 being both aspheric.

The fourth lens element 540 with positive refractive power has a concave object-side surface 541 and a convex image-side surface 542. The fourth lens element 540 is made of glass material and has the object-side surface 541 and the image-side surface 542 being both aspheric.

The fifth lens element 550 with positive refractive power has a convex object-side surface 551 and a convex image-side surface 552. The fifth lens element 550 is made of plastic material and has the object-side surface 551 and the image-side surface 552 being both aspheric.

The sixth lens element 560 with negative refractive power has a concave object-side surface 561 and a concave image-side surface 562. The sixth lens element 560 is made of plastic material and has the object-side surface 561 and the image-side surface 562 being both aspheric.

The IR-cut filter 570 and the cover glass 575 are made of glass material and located between the sixth lens element 560 and the image surface 580, and will not affect the focal length of the imaging lens assembly. The image sensor 590 is disposed on or near the image surface 580 of the imaging lens assembly.

The detailed optical data of the 5th embodiment are shown in Table 9 and the aspheric surface data are shown in Table 10 below.

TABLE 9

5th Embodiment
f = 8.87 mm, Fno = 1.65, HFOV = 19.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 32.990 | | 0.750 | Glass | 1.603 | 38.0 | −15.14 |
| 2 | | 7.094 | | 1.095 | | | | |
| 3 | Lens 2 | 11.015 | | 1.913 | Glass | 1.804 | 46.6 | 17.87 |
| 4 | | 43.579 | | 5.616 | | | | |
| 5 | Lens 3 | 6.137 | (ASP) | 1.267 | Plastic | 1.544 | 56.0 | 83.60 |
| 6 | | 6.578 | (ASP) | 0.683 | | | | |
| 7 | Ape. Stop | Plano | | 0.592 | | | | |
| 8 | Lens 4 | −8.932 | (ASP) | 3.372 | Glass | 1.741 | 52.6 | 30.48 |
| 9 | | −7.429 | (ASP) | 0.100 | | | | |
| 10 | Lens 5 | 5.624 | (ASP) | 3.924 | Plastic | 1.544 | 56.0 | 7.18 |
| 11 | | −9.662 | (ASP) | 0.146 | | | | |
| 12 | Lens 6 | −12.333 | (ASP) | 3.322 | Plastic | 1.660 | 20.4 | −6.47 |
| 13 | | 7.231 | (ASP) | 1.000 | | | | |
| 14 | IR-cut filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 2.224 | | | | |
| 18 | Image | Plano | | — | | | | |

Note:
Reference wavelength is 587.6 nm (d-line).

TABLE 10

Aspheric Coefficients

| | Surface # | | | |
|---|---|---|---|---|
| | 5 | 6 | 8 | 9 |
| k = | −1.6343E+00 | −1.4237E+00 | 2.0673E−01 | −1.6948E−01 |
| A4 = | 3.1621E−05 | −9.2043E−04 | — | — |
| A6 = | 4.1758E−05 | 8.8975E−05 | — | — |

| | Surface # | | | |
|---|---|---|---|---|
| | 10 | 11 | 12 | 13 |
| k = | −7.5953E−01 | −7.5026E+00 | 8.2804E−02 | 2.8098E−01 |
| A4 = | −1.4529E−04 | −5.9395E−05 | 1.2932E−03 | 1.9761E−03 |
| A6 = | −6.2186E−06 | −1.1683E−05 | −3.4402E−05 | 4.5590E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 8.87 | (CT5 + CT6)/(CT1 + CT2 + CT3 + CT4) | 0.99 |
| Fno | 1.65 | (R5 − R6)/(R5 + R6) | −0.03 |
| HFOV [deg.] | 19.8 | ((R9 + R10)/(R9 − R10)) + ((R11 + R12)/(R11 − R12)) | −0.003 |
| V1 | 38.0 | (|P1| + |P2|)/(|P5| + |P6|) | 0.42 |
| V2 | 46.6 | Y11/Y62 | 1.93 |
| V3 | 56.0 | f/EPD | 1.65 |
| V4 | 52.6 | fr/ff | 0.05 |
| V5 | 56.0 | TL/f | 3.04 |
| V6 | 20.4 | ΣCT/Td | 0.64 |
| Nmax | 1.804 | Td/ImgH | 7.12 |
| T12/T34 | 0.86 | EPD/ImgH | 1.68 |
| f/R12 | 1.23 | tan(2*HFOV) | 0.83 |

6th Embodiment

Figure 11:
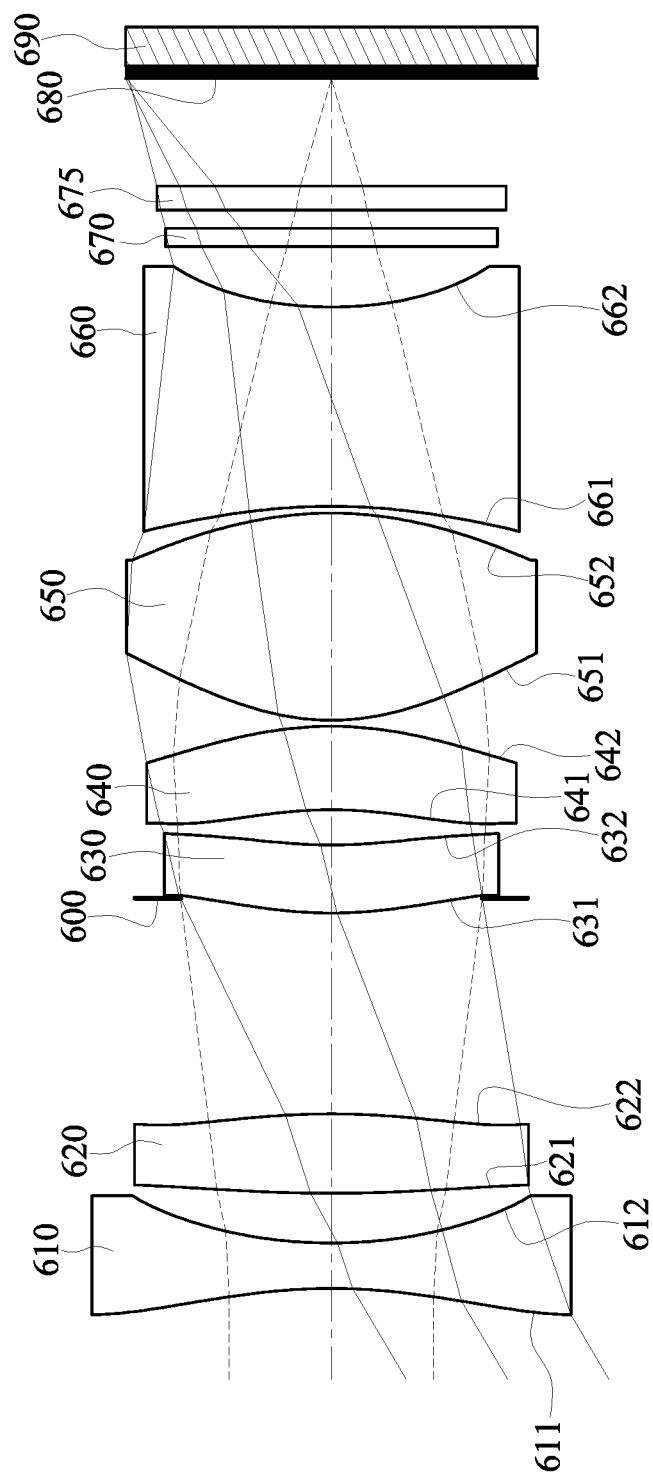
FIG. 11 is a schematic view of an image capturing unit according to the 6th embodiment of the present disclosure.
Figure 12:
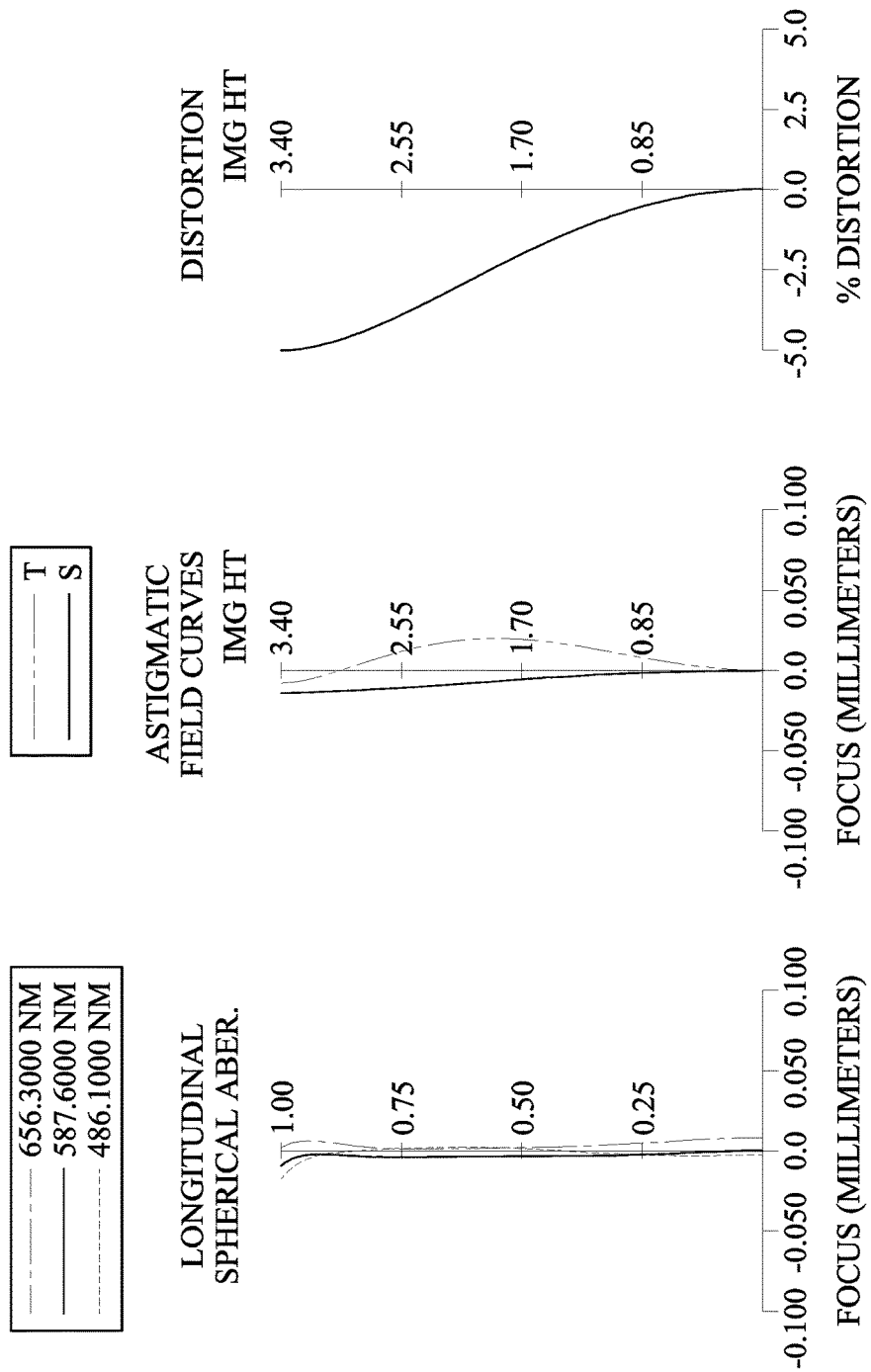
FIG. 12 shows spherical aberration curves, astigmatic field curves and a distortion curve of the image capturing unit according to the 6th embodiment.

FIG. 11 is a schematic view of an image capturing unit according to the 6th embodiment of the present disclosure. FIG. 12 shows, in order from left to right, spherical aberration curves, astigmatic field curves and a distortion curve of the image capturing unit according to the 6th embodiment. In FIG. 11, the image capturing unit includes the imaging lens assembly (its reference numeral is omitted) of the present disclosure and an image sensor 690. The imaging lens assembly includes, in order from an object side to an image side, a first lens element 610, a second lens element 620, an aperture stop 600, a third lens element 630, a fourth lens element 640, a fifth lens element 650, a sixth lens element 660, an IR-cut filter 670, a cover glass 675 and an image surface 680, wherein the imaging lens assembly has a total of six single and non-cemented lens elements (610-660).

The first lens element 610 with negative refractive power has a concave object-side surface 611 and a concave image-side surface 612. The first lens element 610 is made of plastic material and has the object-side surface 611 and the image-side surface 612 being both aspheric.

The second lens element 620 with positive refractive power has a convex object-side surface 621 and a convex image-side surface 622. The second lens element 620 is made of plastic material and has the object-side surface 621 and the image-side surface 622 being both aspheric.

The third lens element 630 with positive refractive power has a convex object-side surface 631 and a concave image-side surface 632. The third lens element 630 is made of plastic material and has the object-side surface 631 and the image-side surface 632 being both aspheric.

The fourth lens element 640 with positive refractive power has a concave object-side surface 641 and a convex image-side surface 642. The fourth lens element 640 is made of plastic material and has the object-side surface 641 and the image-side surface 642 being both aspheric.

The fifth lens element 650 with positive refractive power has a convex object-side surface 651 and a convex image-side surface 652. The fifth lens element 650 is made of plastic material and has the object-side surface 651 and the image-side surface 652 being both aspheric.

The sixth lens element 660 with negative refractive power has a concave object-side surface 661 and a concave image-side surface 662. The sixth lens element 660 is made of plastic material and has the object-side surface 661 and the image-side surface 662 being both aspheric.

The IR-cut filter 670 and the cover glass 675 are made of glass material and located between the sixth lens element 660 and the image surface 680, and will not affect the focal length of the imaging lens assembly. The image sensor 690 is disposed on or near the image surface 680 of the imaging lens assembly.

The detailed optical data of the 6th embodiment are shown in Table 11 and the aspheric surface data are shown in Table 12 below.

TABLE 11

6th Embodiment
f = 6.08 mm, Fno = 1.80, HFOV = 30.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −9.329 | (ASP) | 0.750 | Plastic | 1.544 | 56.0 | −7.73 |
| 2 | | 7.877 | (ASP) | 0.821 | | | | |
| 3 | Lens 2 | 22.675 | (ASP) | 1.312 | Plastic | 1.544 | 56.0 | 15.35 |
| 4 | | −12.950 | (ASP) | 3.566 | | | | |
| 5 | Ape. Stop | Plano | | −0.245 | | | | |
| 6 | Lens 3 | 6.865 | (ASP) | 1.125 | Plastic | 1.544 | 56.0 | 84.12 |
| 7 | | 7.610 | (ASP) | 0.583 | | | | |
| 8 | Lens 4 | −7.047 | (ASP) | 1.381 | Plastic | 1.544 | 56.0 | 50.71 |
| 9 | | −6.001 | (ASP) | 0.100 | | | | |
| 10 | Lens 5 | 3.989 | (ASP) | 3.424 | Plastic | 1.544 | 56.0 | 5.08 |
| 11 | | −6.281 | (ASP) | 0.112 | | | | |
| 12 | Lens 6 | −10.436 | (ASP) | 3.295 | Plastic | 1.660 | 20.4 | −5.61 |
| 13 | | 6.451 | (ASP) | 1.000 | | | | |
| 14 | IR-cut filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 1.779 | | | | |
| 18 | Image | Plano | | — | | | | |

Note:
Reference wavelength is 587.6 nm (d-line).

TABLE 12

Aspheric Coefficients

| Surface # | | | | | |
|---|---|---|---|---|---|
| 1 | 2 | 3 | 4 | 6 | 7 |
| k = −8.5655E+00 | 3.2778E+00 | −8.0537E+01 | −7.7148E+00 | −1.6370E+01 | −2.6193E+01 |
| A4 = 6.5569E−04 | −6.3077E−04 | −2.5523E−04 | 7.6516E−04 | 4.8739E−08 | −4.2134E−03 |
| A6 = 1.6317E−05 | −4.4270E−05 | −1.0758E−05 | 1.0685E−04 | −2.2634E−04 | 2.4983E−04 |
| A8 = — | — | — | — | 1.1611E−05 | — |

| Surface # | | | | | |
|---|---|---|---|---|---|
| 8 | 9 | 10 | 11 | 12 | 13 |
| k = −9.0000E+00 | −3.3132E+00 | −2.2285E+00 | −3.9928E+00 | 4.5646E+00 | 7.7587E−02 |
| A4 = 2.8678E−03 | 8.5783E−04 | −7.9640E−04 | −4.2599E−04 | 1.2534E−03 | 2.0069E−03 |
| A6 = 9.2159E−05 | 4.5560E−06 | 1.1818E−06 | 3.6594E−06 | 1.0063E−05 | 9.7782E−05 |
| A8 = — | — | — | — | — | −2.3197E−06 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 6.08 | (CT5 + CT6)/(CT1 + CT2 + CT3 + CT4) | 1.47 |
| Fno | 1.80 | (R5 − R6)/(R5 + R6) | −0.05 |
| HFOV [deg.] | 30.5 | ((R9 + R10)/(R9 − R10)) + ((R11 + R12)/(R11 − R12)) | 0.01 |
| V1 | 56.0 | (|P1| + |P2|)/(|P5| + |P6|) | 0.52 |
| V2 | 56.0 | Y11/Y62 | 1.52 |
| V3 | 56.0 | f/EPD | 1.80 |
| V4 | 56.0 | fr/ff | −0.33 |
| V5 | 56.0 | TL/f | 3.29 |
| V6 | 20.4 | ΣCT/Td | 0.70 |
| Nmax | 1.660 | Td/ImgH | 4.77 |
| T12/T34 | 1.41 | EPD/ImgH | 0.99 |
| f/R12 | 0.94 | tan(2*HFOV) | 1.80 |

7th Embodiment

Figure 13:
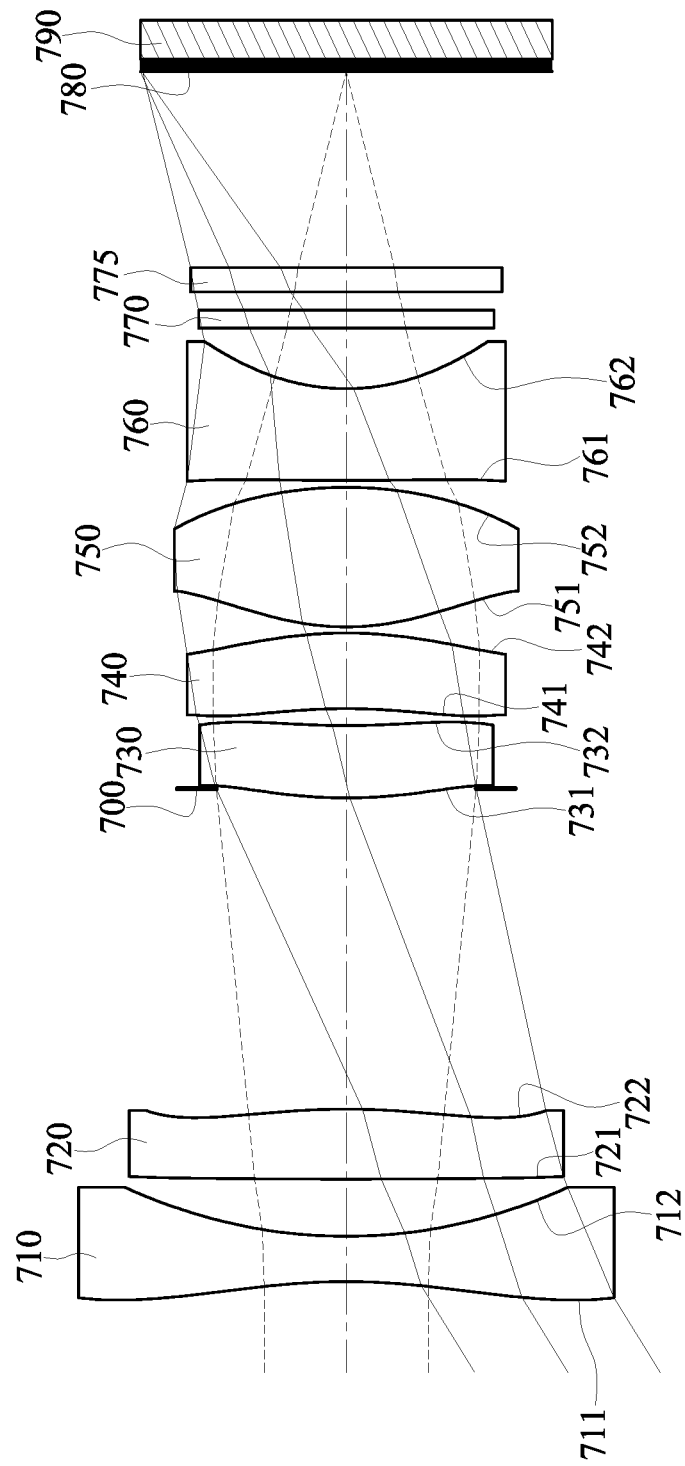
FIG. 13 is a schematic view of an image capturing unit according to the 7th embodiment of the present disclosure.
Figure 14:
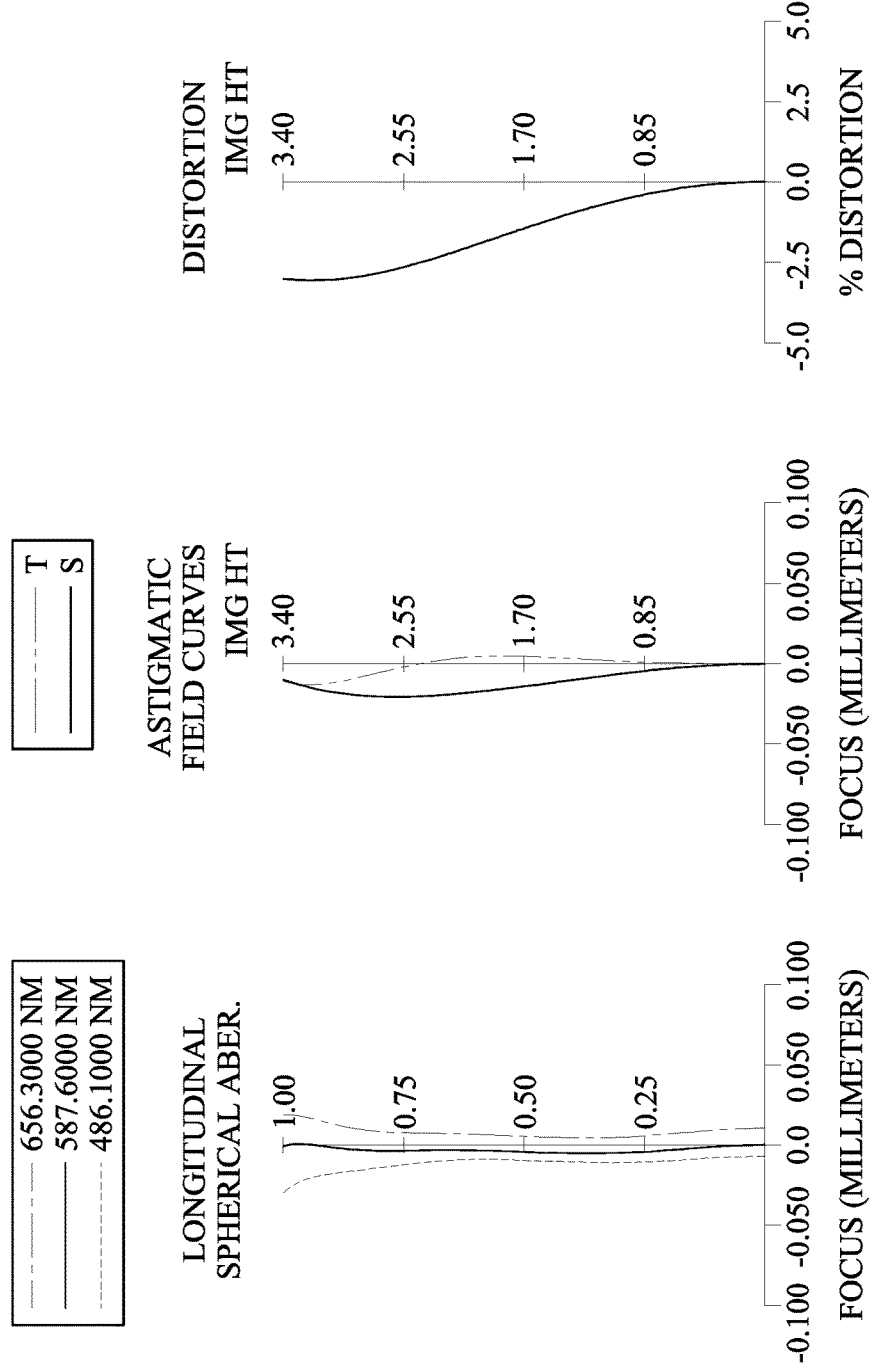
FIG. 14 shows spherical aberration curves, astigmatic field curves and a distortion curve of the image capturing unit according to the 7th embodiment.

FIG. 13 is a schematic view of an image capturing unit according to the 7th embodiment of the present disclosure. FIG. 14 shows, in order from left to right, spherical aberration curves, astigmatic field curves and a distortion curve of the image capturing unit according to the 7th embodiment. In FIG. 13, the image capturing unit includes the imaging lens assembly (its reference numeral is omitted) of the present disclosure and an image sensor 790. The imaging lens assembly includes, in order from an object side to an image side, a first lens element 710, a second lens element 720, an aperture stop 700, a third lens element 730, a fourth lens element 740, a fifth lens element 750, a sixth lens element 760, an IR-cut filter 770, a cover glass 775 and an image surface 780, wherein the imaging lens assembly has a total of six single and non-cemented lens elements (710-760).

The first lens element 710 with negative refractive power has a concave object-side surface 711 and a concave image-side surface 712. The first lens element 710 is made of plastic material and has the object-side surface 711 and the image-side surface 712 being both aspheric.

The second lens element 720 with positive refractive power has a convex object-side surface 721 and a convex image-side surface 722. The second lens element 720 is made of plastic material and has the object-side surface 721 and the image-side surface 722 being both aspheric.

The third lens element 730 with positive refractive power has a convex object-side surface 731 and a concave image-side surface 732. The third lens element 730 is made of plastic material and has the object-side surface 731 and the image-side surface 732 being both aspheric.

The fourth lens element 740 with positive refractive power has a concave object-side surface 741 and a convex image-side surface 742. The fourth lens element 740 is made of plastic material and has the object-side surface 741 and the image-side surface 742 being both aspheric.

The fifth lens element 750 with positive refractive power has a convex object-side surface 751 and a convex image-side surface 752. The fifth lens element 750 is made of plastic material and has the object-side surface 751 and the image-side surface 752 being both aspheric.

The sixth lens element 760 with negative refractive power has a convex object-side surface 761 and a concave image-side surface 762. The sixth lens element 760 is made of plastic material and has the object-side surface 761 and the image-side surface 762 being both aspheric.

The IR-cut filter 770 and the cover glass 775 are made of glass material and located between the sixth lens element 760 and the image surface 780, and will not affect the focal length of the imaging lens assembly. The image sensor 790 is disposed on or near the image surface 780 of the imaging lens assembly.

The detailed optical data of the 7th embodiment are shown in Table 13 and the aspheric surface data are shown in Table 14 below.

TABLE 13

7th Embodiment
f = 5.68 mm, Fno = 2.10, HFOV = 31.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −10.521 | (ASP) | 0.750 | Plastic | 1.544 | 56.0 | −8.60 |
| 2 | | 8.632 | (ASP) | 0.943 | | | | |
| 3 | Lens 2 | 166.405 | (ASP) | 1.158 | Plastic | 1.544 | 56.0 | 20.62 |
| 4 | | −11.997 | (ASP) | 5.298 | | | | |
| 5 | Ape. Stop | Plano | | −0.154 | | | | |
| 6 | Lens 3 | 7.654 | (ASP) | 1.196 | Plastic | 1.544 | 56.0 | 37.31 |
| 7 | | 11.610 | (ASP) | 0.281 | | | | |
| 8 | Lens 4 | −9.999 | (ASP) | 1.252 | Plastic | 1.544 | 56.0 | 40.00 |
| 9 | | −7.153 | (ASP) | 0.100 | | | | |
| 10 | Lens 5 | 4.176 | (ASP) | 2.307 | Plastic | 1.544 | 56.0 | 5.12 |
| 11 | | −6.732 | (ASP) | 0.112 | | | | |
| 12 | Lens 6 | 46.790 | (ASP) | 1.519 | Plastic | 1.660 | 20.4 | −5.95 |
| 13 | | 3.578 | (ASP) | 1.000 | | | | |
| 14 | IR-cut filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 3.242 | | | | |
| 18 | Image | Plano | | — | | | | |

Note:
Reference wavelength is 587.6 nm (d-line).

TABLE 14

Aspheric Coefficients

| Surface # | | | | | |
|---|---|---|---|---|---|
| 1 | 2 | 3 | 4 | 6 | 7 |
| k = −1.4760E+01 | 2.5840E+00 | −1.6000E+01 | −6.6098E+00 | −1.3243E+01 | −6.4729E+01 |
| A4 = 9.8043E−04 | −2.1692E−04 | −2.1145E−04 | 2.1628E−03 | −3.2873E−04 | −4.8061E−03 |
| A6 = 1.3990E−06 | −5.1302E−05 | 1.9655E−05 | 5.1845E−05 | −3.2844E−04 | 6.3460E−05 |
| A8 = — | — | — | 4.7575E−06 | −2.1862E−05 | −6.6460E−06 |

| Surface # | | | | | |
|---|---|---|---|---|---|
| 8 | 9 | 10 | 11 | 12 | 13 |
| k = −1.4914E+01 | −4.1609E+00 | −3.6384E+00 | −6.0449E−01 | −5.8000E+01 | 1.4469E−01 |
| A4 = 2.5760E−03 | 9.9053E−04 | −9.1707E−04 | −7.6337E−04 | −1.8617E−03 | −1.8759E−03 |
| A6 = 2.4844E−04 | 1.2523E−04 | −2.2201E−04 | −5.7438E−05 | 2.2887E−05 | −2.1376E−04 |
| A8 = — | — | — | — | — | −2.1452E−05 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 5.68 | (CT5 + CT6)/(CT1 + CT2 + CT3 + CT4) | 0.88 |
| Fno | 2.10 | (R5 − R6)/(R5 + R6) | −0.21 |
| HFOV [deg.] | 31.7 | ((R9 + R10)/(R9 − R10)) + ((R11 + R12)/(R11 − R12)) | 0.93 |
| V1 | 56.0 | (\|P1\| + \|P2\|)/(\|P5\| + \|P6\|) | 0.45 |
| V2 | 56.0 | Y11/Y62 | 1.89 |
| V3 | 56.0 | f/EPD | 2.10 |
| V4 | 56.0 | fr/ff | −0.37 |
| V5 | 56.0 | TL/f | 3.52 |
| V6 | 20.4 | ΣCT/Td | 0.55 |
| Nmax | 1.660 | Td/ImgH | 4.34 |
| T12/T34 | 3.36 | EPD/ImgH | 0.80 |
| f/R12 | 1.59 | tan(2*HFOV) | 2.00 |

8th Embodiment

Figure 15:
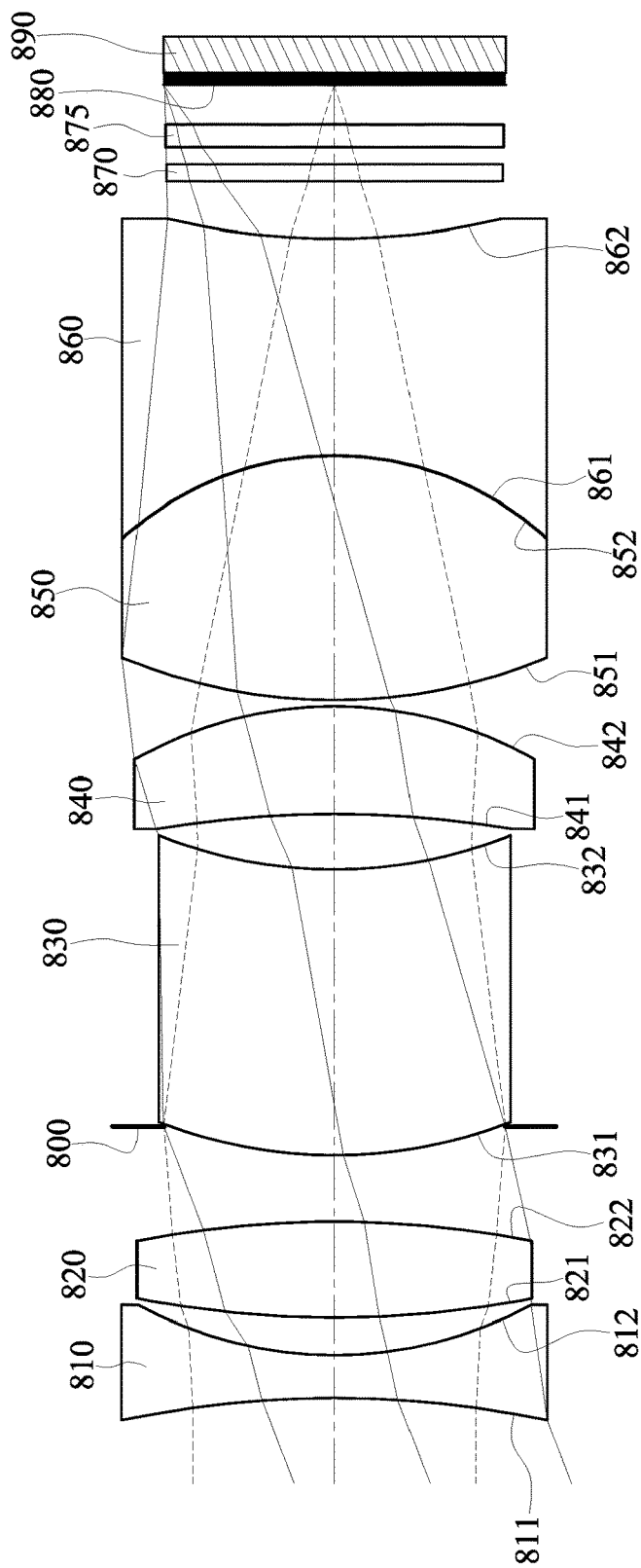
FIG. 15 is a schematic view of an image capturing unit according to the 8th embodiment of the present disclosure.
Figure 16:
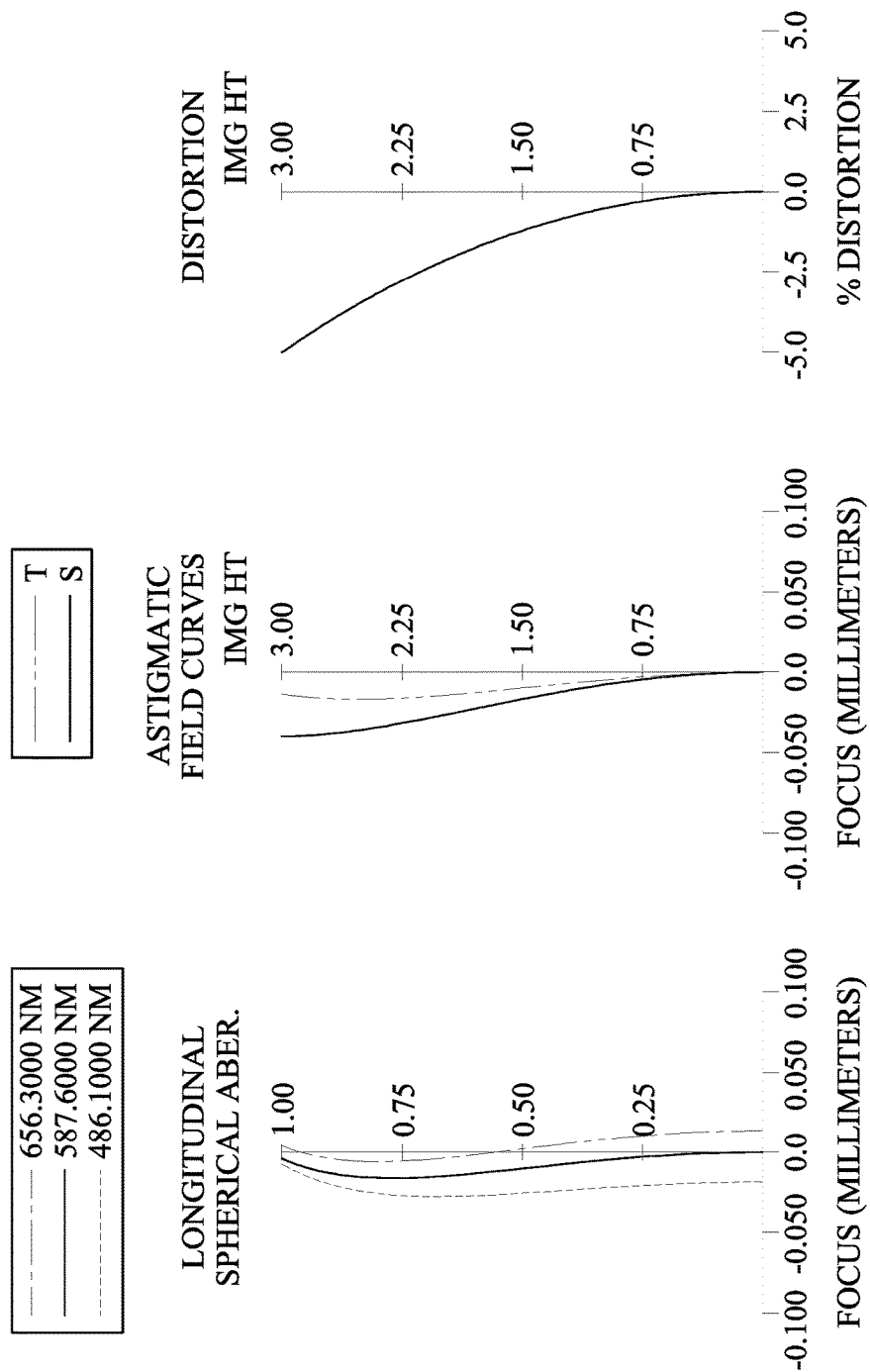
FIG. 16 shows spherical aberration curves, astigmatic field curves and a distortion curve of the image capturing unit according to the 8th embodiment.

FIG. 15 is a schematic view of an image capturing unit according to the 8th embodiment of the present disclosure. FIG. 16 shows, in order from left to right, spherical aberration curves, astigmatic field curves and a distortion curve of the image capturing unit according to the 8th embodiment. In FIG. 15, the image capturing unit includes the imaging lens assembly (its reference numeral is omitted) of the present disclosure and an image sensor 890. The imaging lens assembly includes, in order from an object side to an image side, a first lens element 810, a second lens element 820, an aperture stop 800, a third lens element 830, a fourth lens element 840, a fifth lens element 850, a sixth lens element 860, an IR-cut filter 870, a cover glass 875 and an image surface 880, wherein the imaging lens assembly has a total of six lens elements (810-860). The first lens element 810, the second lens element 820, the third lens element 830 and the fourth lens element 840 are single and non-cemented lens elements. The fifth lens element 850 and the sixth lens element 860 are cemented lens elements.

The first lens element 810 with negative refractive power has a concave object-side surface 811 and a concave image-side surface 812. The first lens element 810 is made of glass material and has the object-side surface 811 and the image-side surface 812 being both spherical.

The second lens element 820 with positive refractive power has a convex object-side surface 821 and a convex image-side surface 822. The second lens element 820 is made of glass material and has the object-side surface 821 and the image-side surface 822 being both spherical.

The third lens element 830 with positive refractive power has a convex object-side surface 831 and a concave image-side surface 832. The third lens element 830 is made of glass material and has the object-side surface 831 and the image-side surface 832 being both spherical.

The fourth lens element 840 with positive refractive power has a concave object-side surface 841 and a convex image-side surface 842. The fourth lens element 840 is made of glass material and has the object-side surface 841 and the image-side surface 842 being both spherical.

The fifth lens element 850 with positive refractive power has a convex object-side surface 851 and a convex image-side surface 852. The fifth lens element 850 is made of glass material and has the object-side surface 851 and the image-side surface 852 being both spherical.

The sixth lens element 860 with negative refractive power has a concave object-side surface 861 and a concave image-side surface 862. The sixth lens element 860 is made of glass material and has the object-side surface 861 and the image-side surface 862 being both spherical.

The IR-cut filter 870 and the cover glass 875 are made of glass material and located between the sixth lens element 860 and the image surface 880, and will not affect the focal length of the imaging lens assembly. The image sensor 890 is disposed on or near the image surface 880 of the imaging lens assembly.

The detailed optical data of the 8th embodiment are shown in Table 15 below.

TABLE 15

8th Embodiment
f = 8.20 mm, Fno = 1.65, HFOV = 21.1 deg.

| Surface # |          | Curvature Radius | Thickness | Material | Index | Abbe # | Focal Length |
|---|---|---|---|---|---|---|---|
| 0 | Object | Plano | Infinity | | | | |
| 1 | Lens 1 | −17.936 | 0.750 | Glass | 1.606 | 43.7 | −8.40 |
| 2 | | 7.213 | 0.655 | | | | |
| 3 | Lens 2 | 17.920 | 1.682 | Glass | 1.804 | 46.6 | 11.39 |
| 4 | | −17.945 | 1.671 | | | | |
| 5 | Ape. Stop | Plano | −0.500 | | | | |
| 6 | Lens 3 | 8.492 | 5.000 | Glass | 1.804 | 46.6 | 44.15 |
| 7 | | 8.233 | 0.975 | | | | |
| 8 | Lens 4 | −18.974 | 1.887 | Glass | 1.741 | 52.6 | 14.16 |
| 9 | | −7.041 | 0.100 | | | | |
| 10 | Lens 5 | 9.621 | 4.282 | Glass | 1.804 | 46.6 | 4.98 |
| 11 | | −5.501 | 0.010 | Cement | 1.514 | 38.8 | |
| 12 | Lens 6 | −5.499 | 3.800 | Glass | 1.847 | 23.8 | −4.11 |
| 13 | | 12.446 | 1.000 | | | | |
| 14 | IR-cut filter | Plano | 0.300 | Glass | 1.517 | 64.2 | — |
| 15 | | Plano | 0.300 | | | | |
| 16 | Cover glass | Plano | 0.400 | Glass | 1.517 | 64.2 | — |
| 17 | | Plano | 0.696 | | | | |
| 18 | Image | Plano | — | | | | |

Note:
Reference wavelength is 587.6 nm (d-line).

In the 8th embodiment, the definitions of these parameters shown in the following table are the same as those stated in the 1st embodiment with corresponding values for the 8th embodiment, so an explanation in this regard will not be provided again.

Moreover, these parameters can be calculated from Table 15 as the following values and satisfy the following conditions:

| 8th Embodiment | | | |
|---|---|---|---|
| f [mm] | 8.20 | (CT5 + CT6)/(CT1 + CT2 + CT3 + CT4) | 0.87 |
| Fno | 1.65 | (R5 + R6)/(R5 + R6) | 0.02 |
| HFOV [deg.] | 21.1 | ((R9 + R10)/(R9 + R10)) + ((R11 + R12)/(R11 − R12)) | −0.11 |
| V1 | 43.7 | (|P1| + |P2|)/(|P5| + |P6|) | 0.47 |
| V2 | 46.6 | Y11/Y62 | 1.28 |
| V3 | 46.6 | f/EPD | 1.65 |
| V4 | 52.6 | fr/ff | −0.15 |
| V5 | 46.6 | TL/f | 2.81 |
| V6 | 23.8 | ΣCT/Td | 0.86 |
| Nmax | 1.847 | Td/ImgH | 6.77 |
| T12/T34 | 0.67 | EPD/ImgH | 1.66 |
| f/R12 | 0.66 | tan(2*HFOV) | 0.91 |

9th Embodiment

Figure 17:
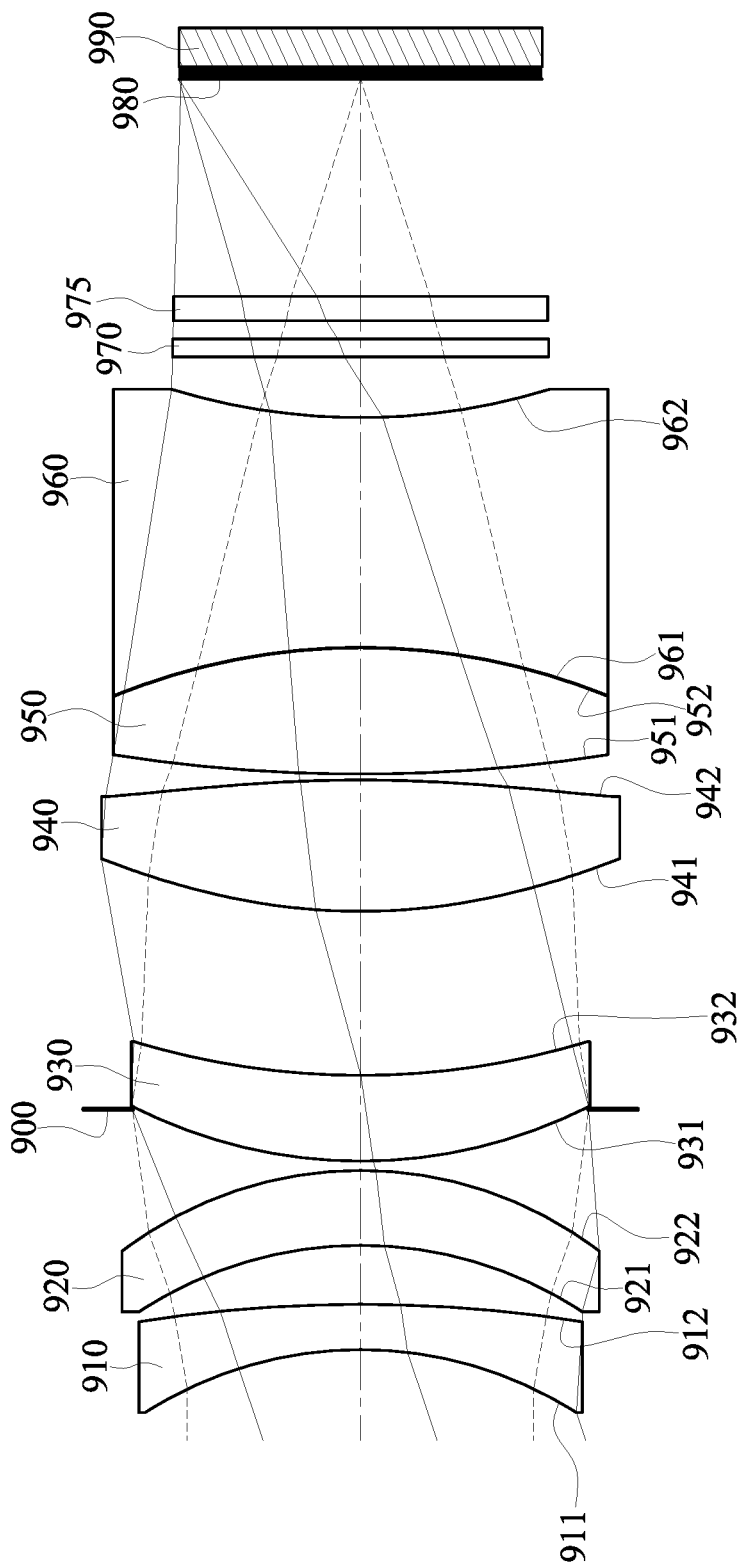
FIG. 17 is a schematic view of an image capturing unit according to the 9th embodiment of the present disclosure.
Figure 18:
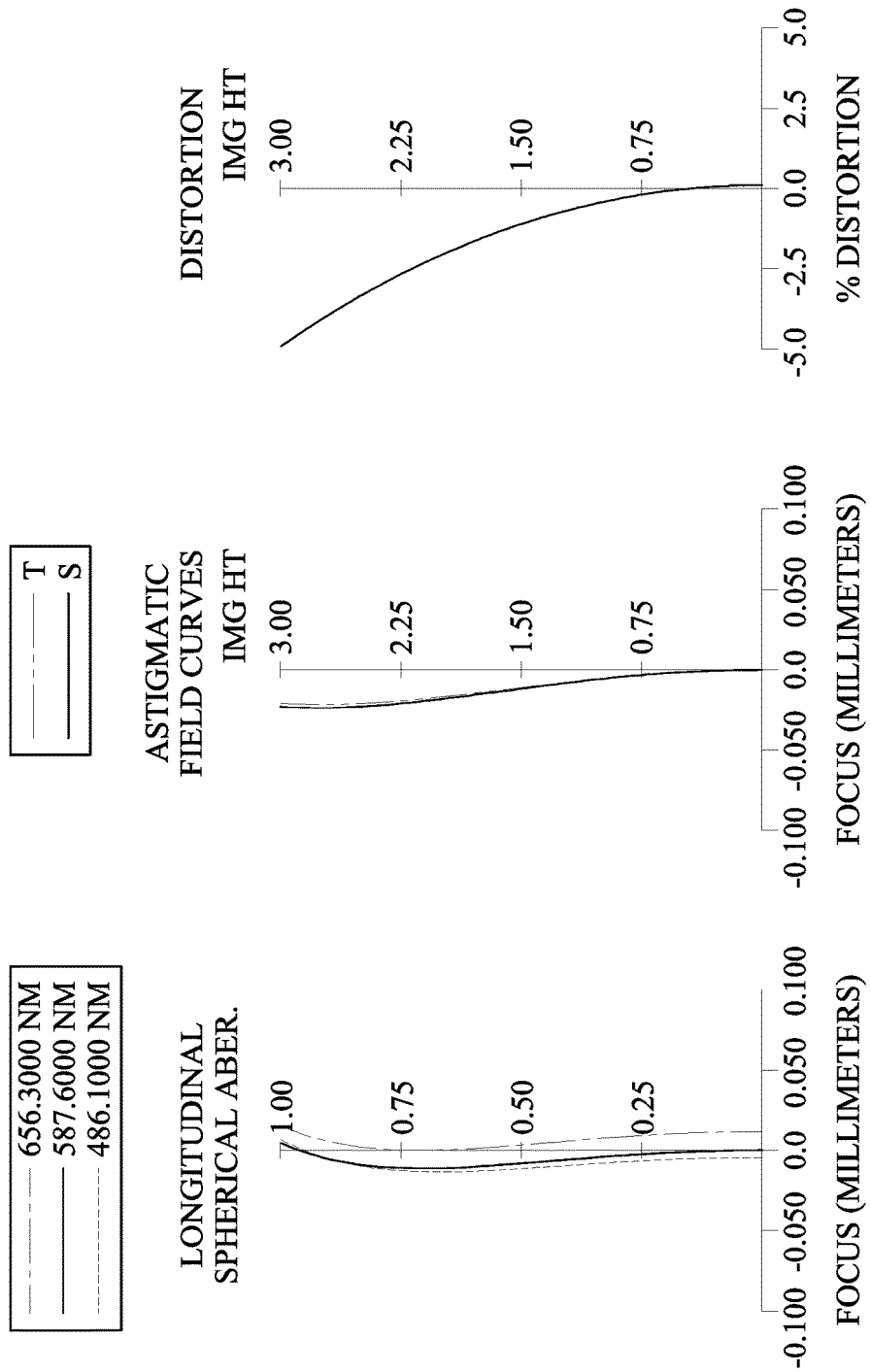
FIG. 18 shows spherical aberration curves, astigmatic field curves and a distortion curve of the image capturing unit according to the 9th embodiment.

FIG. 17 is a schematic view of an image capturing unit according to the 9th embodiment of the present disclosure. FIG. 18 shows, in order from left to right, spherical aberration curves, astigmatic field curves and a distortion curve of the image capturing unit according to the 9th embodiment. In FIG. 17, the image capturing unit includes the imaging lens assembly (its reference numeral is omitted) of the present disclosure and an image sensor 990. The imaging lens assembly includes, in order from an object side to an image side, a first lens element 910, a second lens element 920, an aperture stop 900, a third lens element 930, a fourth lens element 940, a fifth lens element 950, a sixth lens element 960, an IR-cut filter 970, a cover glass 975 and an image surface 980, wherein the imaging lens assembly has a total of six lens elements (910-960). The first lens element 910, the second lens element 920, the third lens element 930 and the fourth lens element 940 are single and non-cemented lens elements. The fifth lens element 950 and the sixth lens element 960 are cemented lens elements.

side surface 962. The sixth lens element 960 is made of glass material and has the object-side surface 961 and the image-side surface 962 being both spherical.

The IR-cut filter 970 and the cover glass 975 are made of glass material and located between the sixth lens element 960 and the image surface 980, and will not affect the focal length of the imaging lens assembly. The image sensor 990 is disposed on or near the image surface 980 of the imaging lens assembly.

The detailed optical data of the 9th embodiment are shown in Table 16 and the aspheric surface data are shown in Table 17 below.

TABLE 16

9th Embodiment
f = 9.44 mm, Fno = 1.65, HFOV = 18.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | −6.612 | 0.750 | Glass | 1.606 | 43.7 | −15.50 |
| 2 | | −23.335 | 0.972 | | | | |
| 3 | Lens 2 | −6.640 | 1.238 | Glass | 1.804 | 46.6 | 75.82 |
| 4 | | −6.486 | 1.013 | | | | |
| 5 | Ape. Stop | Plano | −0.863 | | | | |
| 6 | Lens 3 | 8.299 | 1.419 | Glass | 1.804 | 46.6 | 25.64 |
| 7 | | 12.832 | 2.717 | | | | |
| 8 | Lens 4 | 10.063 (ASP) | 2.170 | Glass | 1.741 | 52.6 | 9.83 |
| 9 | | −23.938 (ASP) | 0.100 | | | | |
| 10 | Lens 5 | 26.302 | 2.083 | Glass | 1.804 | 46.6 | 9.75 |
| 11 | | −10.773 | 0.010 | Cement | 1.514 | 38.8 | |
| 12 | Lens 6 | −10.773 | 3.800 | Glass | 1.847 | 23.8 | −5.85 |
| 13 | | 10.636 | 1.000 | | | | |
| 14 | IR-cut filter | Plano | 0.300 | Glass | 1.517 | 64.2 | — |
| 15 | | Plano | 0.300 | | | | |
| 16 | Cover glass | Plano | 0.400 | Glass | 1.517 | 64.2 | — |
| 17 | | Plano | 3.594 | | | | |
| 18 | Image | Plano | — | | | | |

Note:
Reference wavelength is 587.6 nm (d-line).

The first lens element 910 with negative refractive power has a concave object-side surface 911 and a convex image-side surface 912. The first lens element 910 is made of glass material and has the object-side surface 911 and the image-side surface 912 being both spherical.

The second lens element 920 with positive refractive power has a concave object-side surface 921 and a convex image-side surface 922. The second lens element 920 is made of glass material and has the object-side surface 921 and the image-side surface 922 being both spherical.

The third lens element 930 with positive refractive power has a convex object-side surface 931 and a concave image-side surface 932. The third lens element 930 is made of glass material and has the object-side surface 931 and the image-side surface 932 being both spherical.

The fourth lens element 940 with positive refractive power has a convex object-side surface 941 and a convex image-side surface 942. The fourth lens element 940 is made of glass material and has the object-side surface 941 and the image-side surface 942 being both aspheric.

The fifth lens element 950 with positive refractive power has a convex object-side surface 951 and a convex image-side surface 952. The fifth lens element 950 is made of glass material and has the object-side surface 951 and the image-side surface 952 being both spherical.

The sixth lens element 960 with negative refractive power has a concave object-side surface 961 and a concave image-

TABLE 17

Aspheric Coefficients

| | Surface # | |
|---|---|---|
| | 8 | 9 |
| k = | −1.3805E+00 | 2.2395E+00 |
| A4 = | −8.0081E−05 | 2.9676E−04 |
| A6 = | — | 1.8142E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 16 and Table 17 as the following values and satisfy the following conditions:

| 9th Embodiment | | | |
|---|---|---|---|
| f [mm] | 9.44 | (CT5 + CT6)/(CT1 + CT2 + CT3 + CT4) | 1.05 |
| Fno | 1.65 | (R5 − R6)/(R5 + R6) | −0.21 |
| HFOV [deg.] | 18.5 | ((R9 + R10)/(R9 − R10)) + ((R11 + R12)/(R11 − R12)) | 0.43 |

-continued

| | | 9th Embodiment | |
|---|---|---|---|
| V1 | 43.7 | (|P1| + |P2|)/(|P5| + |P6|) | 0.28 |
| V2 | 46.6 | Y11/Y62 | 1.14 |
| V3 | 46.6 | f/EPD | 1.65 |
| V4 | 52.6 | fr/ff | −0.37 |
| V5 | 46.6 | TL/f | 2.23 |
| V6 | 23.8 | ΣCT/Td | 0.74 |
| Nmax | 1.847 | Td/ImgH | 5.14 |
| T12/T34 | 0.36 | EPD/ImgH | 1.91 |
| f/R12 | 0.89 | tan(2*HFOV) | 0.75 |

10th Embodiment

Figure 19:
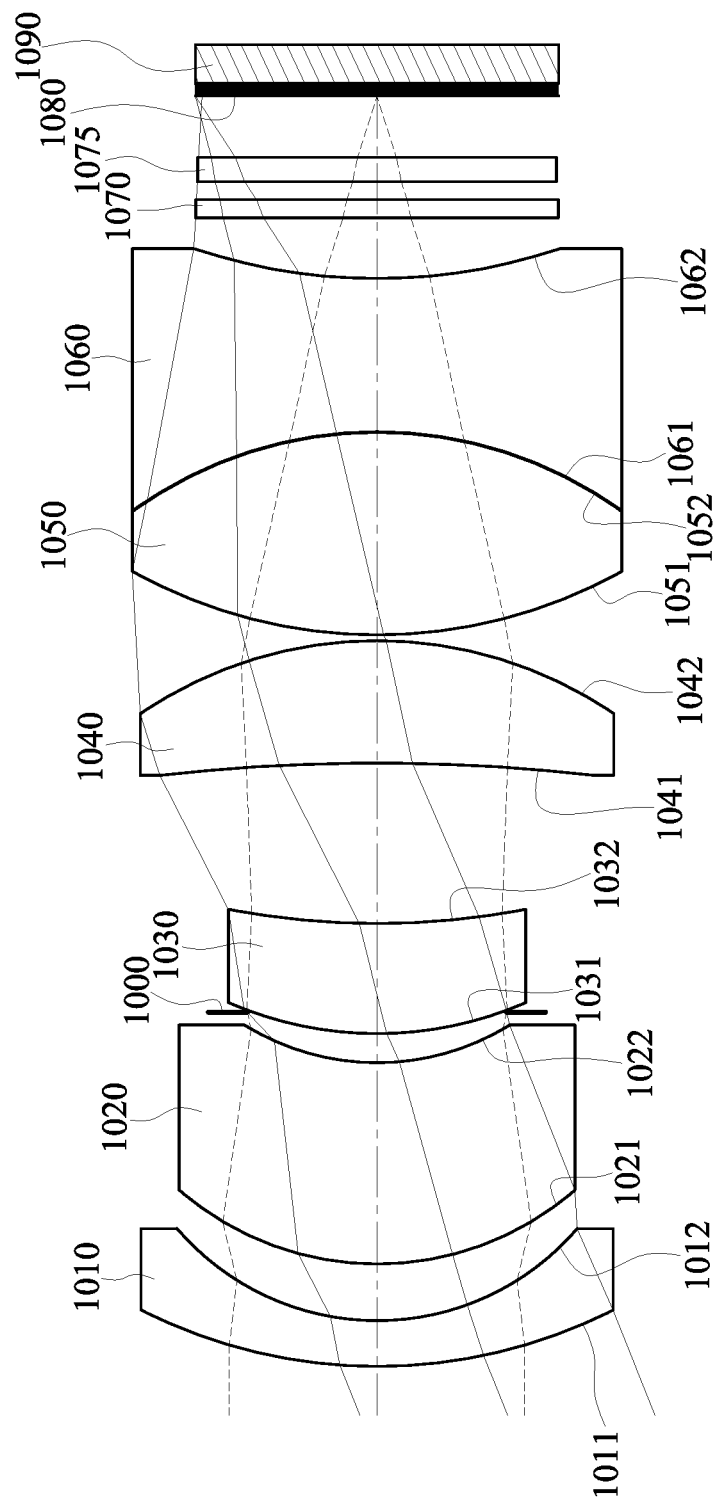
FIG. 19 is a schematic view of an image capturing unit according to the 10th embodiment of the present disclosure.
Figure 20:
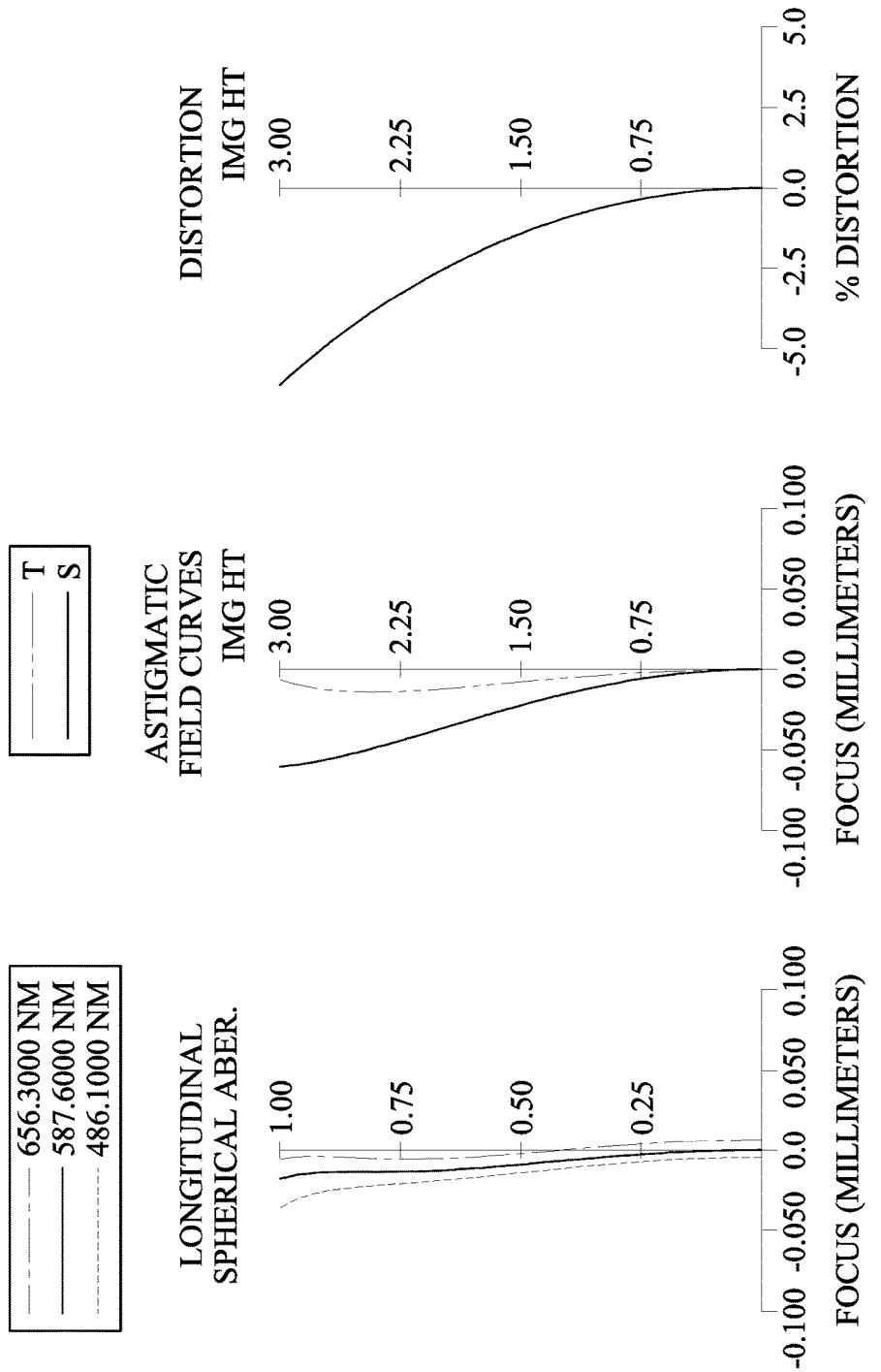
FIG. 20 shows spherical aberration curves, astigmatic field curves and a distortion curve of the image capturing unit according to the 10th embodiment.

FIG. 19 is a schematic view of an image capturing unit according to the 10th embodiment of the present disclosure. FIG. 20 shows, in order from left to right, spherical aberration curves, astigmatic field curves and a distortion curve of the image capturing unit according to the 10th embodiment. In FIG. 19, the image capturing unit includes the imaging lens assembly (its reference numeral is omitted) of the present disclosure and an image sensor 1090. The imaging lens assembly includes, in order from an object side to an image side, a first lens element 1010, a second lens element 1020, an aperture stop 1000, a third lens element 1030, a fourth lens element 1040, a fifth lens element 1050, a sixth lens element 1060, an IR-cut filter 1070, a cover glass 1075 and an image surface 1080, wherein the imaging lens assembly has a total of six lens elements (1010-1060). The first lens element 1010, the second lens element 1020, the third lens element 1030 and the fourth lens element 1040 are single and non-cemented lens elements. The fifth lens element 1050 and the sixth lens element 1060 are cemented lens elements. The first lens element 1010 with negative refractive power has a convex object-side surface 1011 and a concave image-side surface 1012. The first lens element 1010 is made of glass material and has the object-side surface 1011 and the image-side surface 1012 being both spherical.

The second lens element 1020 with positive refractive power has a convex object-side surface 1021 and a concave image-side surface 1022. The second lens element 1020 is made of glass material and has the object-side surface 1021 and the image-side surface 1022 being both spherical.

The third lens element 1030 with positive refractive power has a convex object-side surface 1031 and a concave image-side surface 1032. The third lens element 1030 is made of glass material and has the object-side surface 1031 and the image-side surface 1032 being both spherical.

The fourth lens element 1040 with positive refractive power has a convex object-side surface 1041 and a convex image-side surface 1042. The fourth lens element 1040 is made of glass material and has the object-side surface 1041 and the image-side surface 1042 being both spherical.

The fifth lens element 1050 with positive refractive power has a convex object-side surface 1051 and a convex image-side surface 1052. The fifth lens element 1050 is made of glass material and has the object-side surface 1051 and the image-side surface 1052 being both spherical.

The sixth lens element 1060 with negative refractive power has a concave object-side surface 1061 and a concave image-side surface 1062. The sixth lens element 1060 is made of glass material and has the object-side surface 1061 and the image-side surface 1062 being both spherical.

The IR-cut filter 1070 and the cover glass 1075 are made of glass material and located between the sixth lens element 1060 and the image surface 1080, and will not affect the focal length of the imaging lens assembly. The image sensor 1090 is disposed on or near the image surface 1080 of the imaging lens assembly.

The detailed optical data of the 10th embodiment are shown in Table 18 below.

TABLE 18

10th Embodiment
f = 8.04 mm, Fno = 1.65, HFOV = 21.7 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 8.608 | 0.750 | Glass | 1.656 | 29.8 | −14.40 |
| 2 | | 4.348 | 0.942 | | | | |
| 3 | Lens 2 | 4.976 | 3.327 | Glass | 1.826 | 35.8 | 36.70 |
| 4 | | 4.153 | 0.837 | | | | |
| 5 | Ape. Stop | Plano | −0.353 | | | | |
| 6 | Lens 3 | 6.117 | 1.813 | Glass | 1.804 | 46.6 | 12.95 |
| 7 | | 12.865 | 2.659 | | | | |
| 8 | Lens 4 | −31.902 | 2.018 | Glass | 1.804 | 46.6 | 10.63 |
| 9 | | −6.932 | 0.100 | | | | |
| 10 | Lens 5 | 8.299 | 3.349 | Glass | 1.805 | 46.2 | 5.19 |
| 11 | | −6.893 | 0.010 | Cement | 1.514 | 38.8 | |
| 12 | Lens 6 | −6.893 | 2.534 | Glass | 1.851 | 22.3 | −4.38 |
| 13 | | 9.509 | 1.000 | | | | |
| 14 | IR-cut filter | Plano | 0.300 | Glass | 1.517 | 64.2 | — |
| 15 | | Plano | 0.300 | | | | |
| 16 | Cover glass | Plano | 0.400 | Glass | 1.517 | 64.2 | — |
| 17 | | Plano | 1.016 | | | | |
| 18 | Image | Plano | — | | | | |

Note:
Reference wavelength is 587.6 nm (d-line).

In the 10th embodiment, the definitions of these parameters shown in the following table are the same as those stated in the 1st embodiment with corresponding values for the 10th embodiment, so an explanation in this regard will not be provided again.

Moreover, these parameters can be calculated from Table 18 as the following values and satisfy the following conditions:

| 10th Embodiment | | | |
|---|---|---|---|
| f [mm] | 8.04 | (CT5 + CT6)/(CT1 + CT2 + CT3 + CT4) | 0.74 |
| Fno | 1.65 | (R5 − R6)/(R5 + R6) | −0.36 |
| HFOV [deg.] | 21.7 | ((R9 + R10)/(R9 − R10)) + ((R11 + R12)/(R11 − R12)) | −0.07 |
| V1 | 29.8 | (\|P1\| + \|P2\|)/(\|P5\| + \|P6\|) | 0.23 |
| V2 | 35.8 | Y11/Y62 | 1.29 |
| V3 | 46.6 | f/EPD | 1.65 |
| V4 | 46.6 | fr/ff | −0.36 |
| V5 | 46.2 | TL/f | 2.61 |
| V6 | 22.3 | ΣCT/Td | 0.77 |
| Nmax | 1.851 | Td/ImgH | 6.00 |
| T12/T34 | 0.35 | EPD/ImgH | 1.62 |
| f/R12 | 0.85 | tan(2*HFOV) | 0.95 |

11th Embodiment

Figure 21:
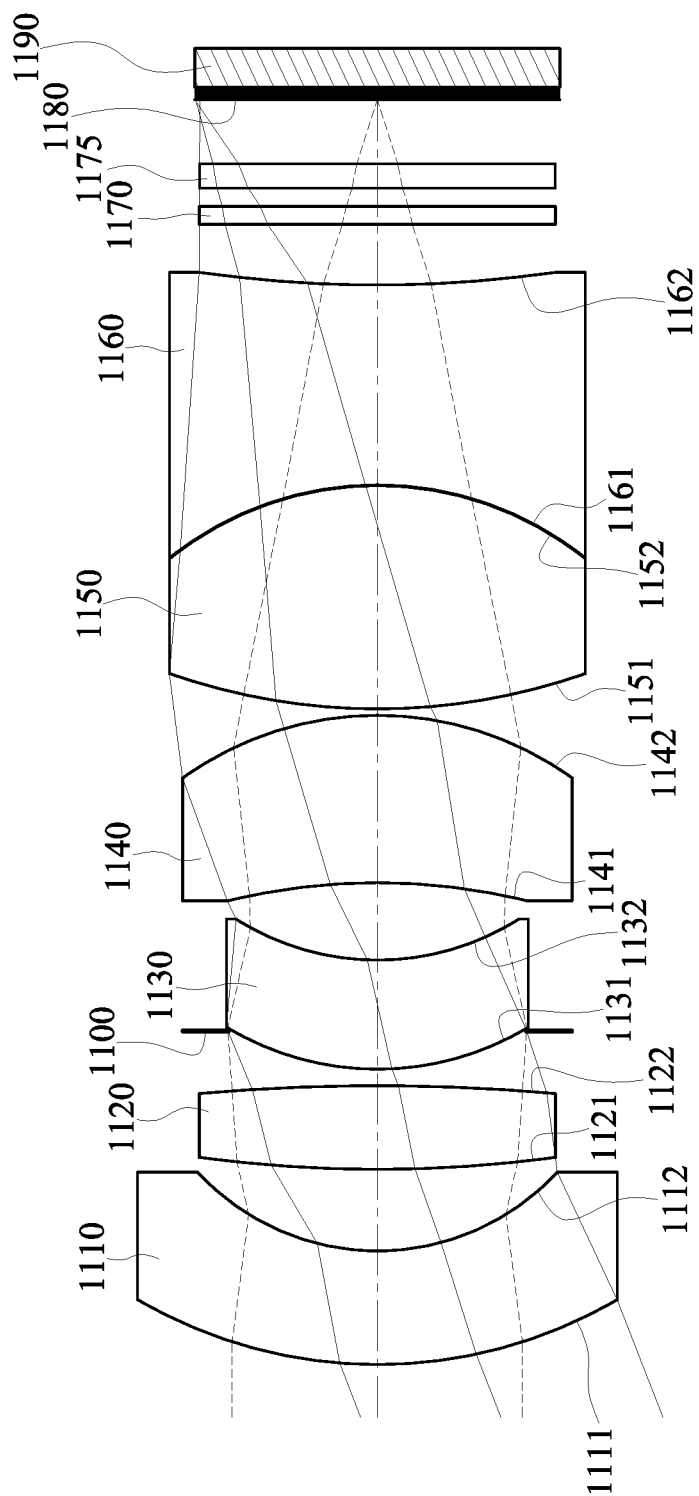
FIG. 21 is a schematic view of an image capturing unit according to the 11th embodiment of the present disclosure.
Figure 22:
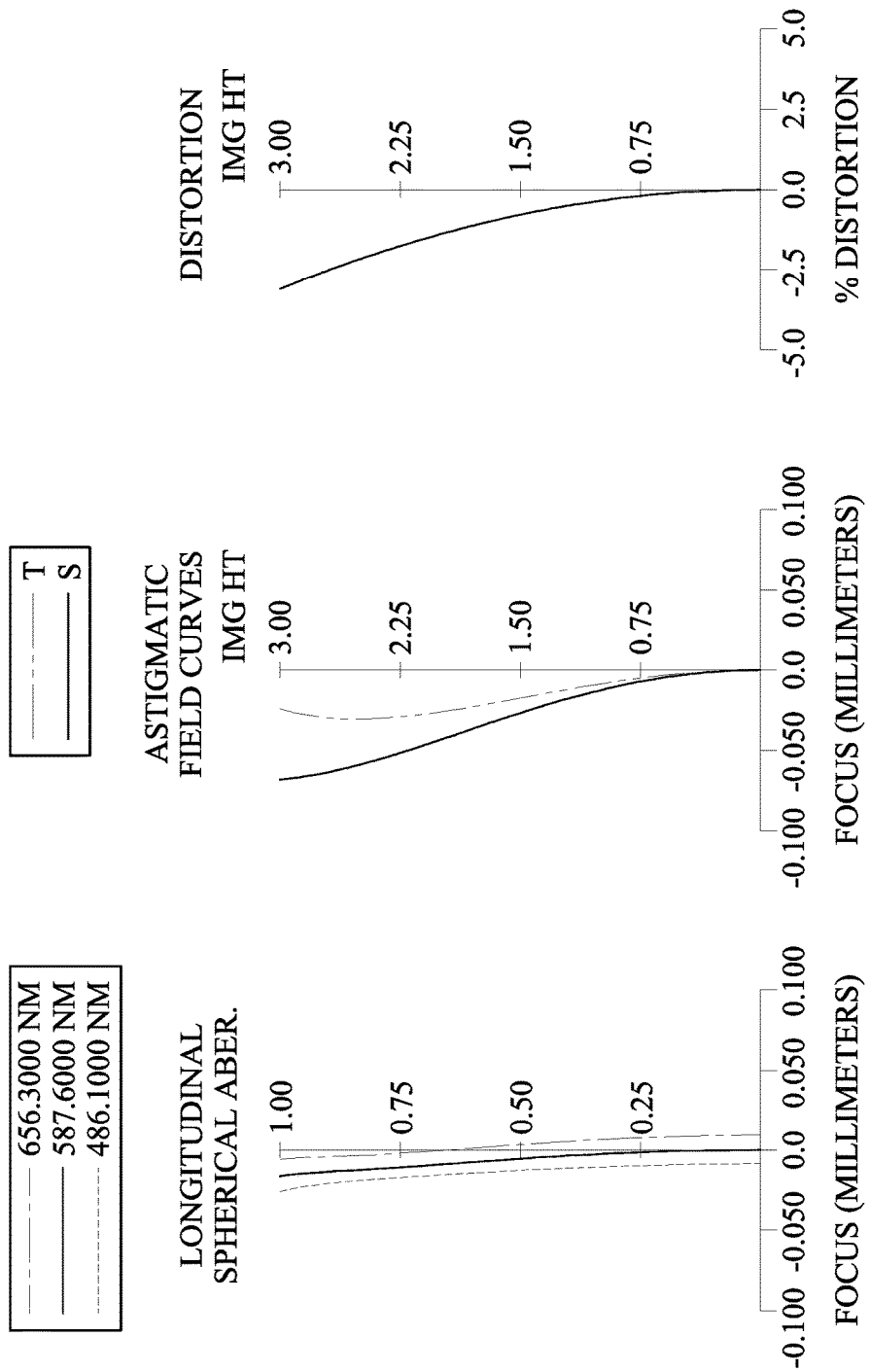
FIG. 22 shows spherical aberration curves, astigmatic field curves and a distortion curve of the image capturing unit according to the 11th embodiment.

FIG. 21 is a schematic view of an image capturing unit according to the 11th embodiment of the present disclosure. FIG. 22 shows, in order from left to right, spherical aberration curves, astigmatic field curves and a distortion curve of the image capturing unit according to the 11th embodiment. In FIG. 21, the image capturing unit includes the imaging lens assembly (its reference numeral is omitted) of the present disclosure and an image sensor 1190. The imaging lens assembly includes, in order from an object side to an image side, a first lens element 1110, a second lens element 1120, an aperture stop 1100, a third lens element 1130, a fourth lens element 1140, a fifth lens element 1150, a sixth lens element 1160, an IR-cut filter 1170, a cover glass 1175 and an image surface 1180, wherein the imaging lens assembly has a total of six lens elements (1110-1160). The first lens element 1110, the second lens element 1120, the third lens element 1130 and the fourth lens element 1140 are single and non-cemented lens elements. The fifth lens element 1150 and the sixth lens element 1160 are cemented lens elements.

The first lens element 1110 with negative refractive power has a convex object-side surface 1111 and a concave image-side surface 1112. The first lens element 1110 is made of glass material and has the object-side surface 1111 and the image-side surface 1112 being both spherical.

The second lens element 1120 with positive refractive power has a convex object-side surface 1121 and a convex image-side surface 1122. The second lens element 1120 is made of glass material and has the object-side surface 1121 and the image-side surface 1122 being both spherical.

The third lens element 1130 with positive refractive power has a convex object-side surface 1131 and a concave image-side surface 1132. The third lens element 1130 is made of glass material and has the object-side surface 1131 and the image-side surface 1132 being both spherical.

The fourth lens element 1140 with positive refractive power has a concave object-side surface 1141 and a convex image-side surface 1142. The fourth lens element 1140 is made of glass material and has the object-side surface 1141 and the image-side surface 1142 being both spherical.

The fifth lens element 1150 with positive refractive power has a convex object-side surface 1151 and a convex image-side surface 1152. The fifth lens element 1150 is made of glass material and has the object-side surface 1151 and the image-side surface 1152 being both spherical.

The sixth lens element 1160 with negative refractive power has a concave object-side surface 1161 and a concave image-side surface 1162. The sixth lens element 1160 is made of glass material and has the object-side surface 1161 and the image-side surface 1162 being both spherical.

The IR-cut filter 1170 and the cover glass 1175 are made of glass material and located between the sixth lens element 1160 and the image surface 1180, and will not affect the focal length of the imaging lens assembly. The image sensor 1190 is disposed on or near the image surface 1180 of the imaging lens assembly.

The detailed optical data of the 11th embodiment are shown in Table 19 below.

TABLE 19

11th Embodiment
f = 7.91 mm, Fno = 1.65, HFOV = 21.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 7.838 | 1.880 | Glass | 1.689 | 31.1 | −15.16 |
| 2 | | 4.039 | 1.349 | | | | |
| 3 | Lens 2 | 21.717 | 1.386 | Glass | 1.804 | 46.6 | 16.53 |
| 4 | | −33.263 | 0.901 | | | | |
| 5 | Ape. Stop | Plano | −0.632 | | | | |
| 6 | Lens 3 | 4.816 | 1.806 | Glass | 1.835 | 42.7 | 68.79 |
| 7 | | 4.360 | 1.283 | | | | |
| 8 | Lens 4 | −10.279 | 2.766 | Glass | 1.772 | 49.6 | 12.28 |
| 9 | | −5.511 | 0.100 | | | | |
| 10 | Lens 5 | 10.374 | 3.700 | Glass | 1.804 | 46.6 | 4.98 |
| 11 | | −5.480 | 0.010 | Cement | 1.514 | 38.8 | |
| 12 | Lens 6 | −5.480 | 3.304 | Glass | 1.847 | 23.8 | −4.84 |
| 13 | | 20.794 | 1.000 | | | | |
| 14 | IR-cut filter | Plano | 0.300 | Glass | 1.517 | 64.2 | — |
| 15 | | Plano | 0.300 | | | | |

TABLE 19-continued

11th Embodiment
f = 7.91 mm, Fno = 1.65, HFOV = 21.4 deg.

| Surface # | | Curvature Radius | Thickness | Material | Index | Abbe # | Focal Length |
|---|---|---|---|---|---|---|---|
| 16 | Cover glass | Plano | 0.400 | Glass | 1.517 | 64.2 | — |
| 17 | | Plano | 1.065 | | | | |
| 18 | Image | Plano | — | | | | |

Note:
Reference wavelength is 587.6 nm (d-line).

In the 11th embodiment, the definitions of these parameters shown in the following table are the same as those stated in the 1st embodiment with corresponding values for the 11th embodiment, so an explanation in this regard will not be provided again.

Moreover, these parameters can be calculated from Table 19 as the following values and satisfy the following conditions:

| 11th Embodiment | | | |
|---|---|---|---|
| f [mm] | 7.91 | (CT5 + CT6)/(CT1 + CT2 + CT3 + CT4) | 0.89 |
| Fno | 1.65 | (R5 − R6)/(R5 + R6) | 0.05 |
| HFOV [deg.] | 21.4 | ((R9 + R10)/(R9 − R10)) + ((R11 + R12)/(R11 − R12)) | −0.27 |
| V1 | 31.1 | (|P1| + |P2|)/(|P5| + |P6|) | 0.31 |
| V2 | 46.6 | Y11/Y62 | 1.35 |
| V3 | 42.7 | f/EPD | 1.65 |
| V4 | 49.6 | fr/ff | −0.04 |
| V5 | 46.6 | TL/f | 2.64 |
| V6 | 23.8 | ΣCT/Td | 0.83 |
| Nmax | 1.847 | Td/ImgH | 5.95 |
| T12/T34 | 1.05 | EPD/ImgH | 1.60 |
| f/R12 | 0.38 | tan(2*HFOV) | 0.93 |

12th Embodiment

Figure 23:
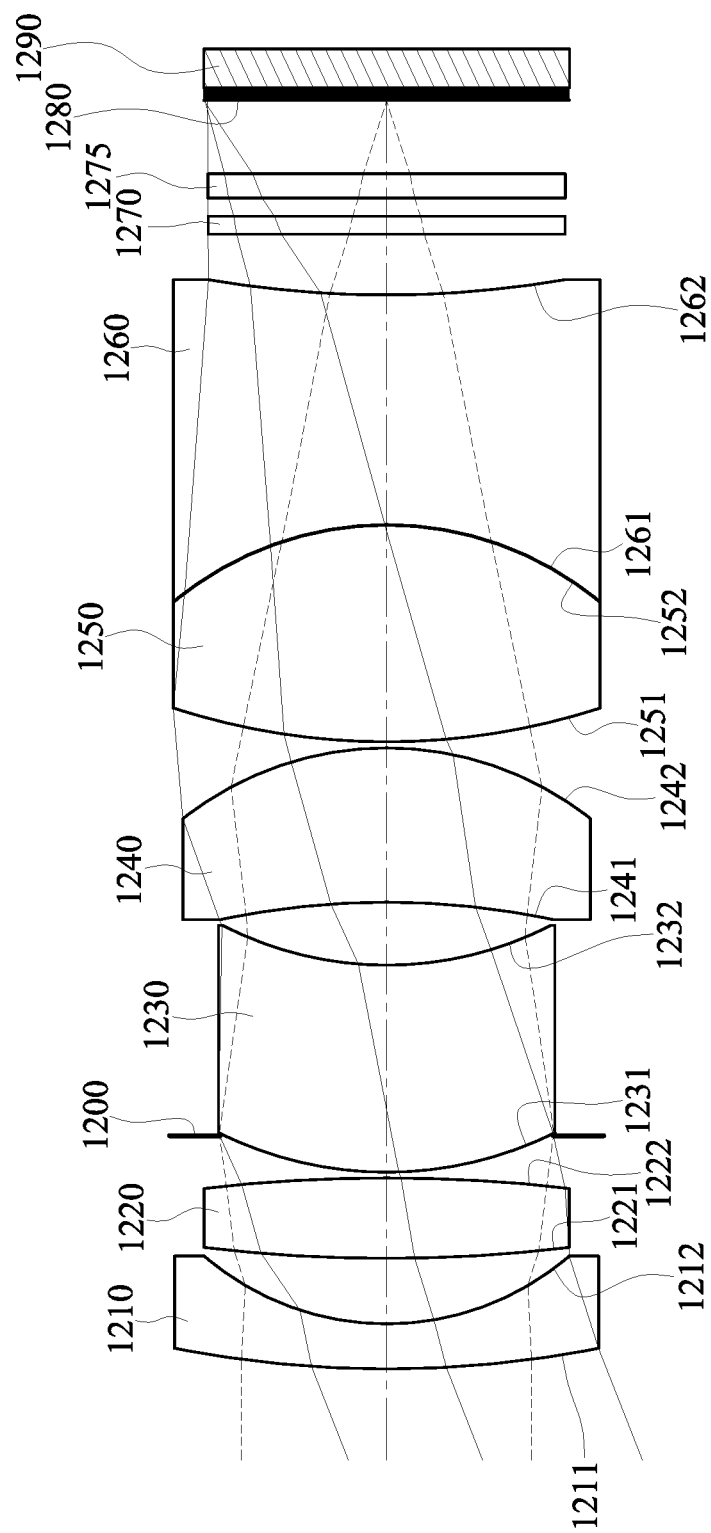
FIG. 23 is a schematic view of an image capturing unit according to the 12th embodiment of the present disclosure.
Figure 24:
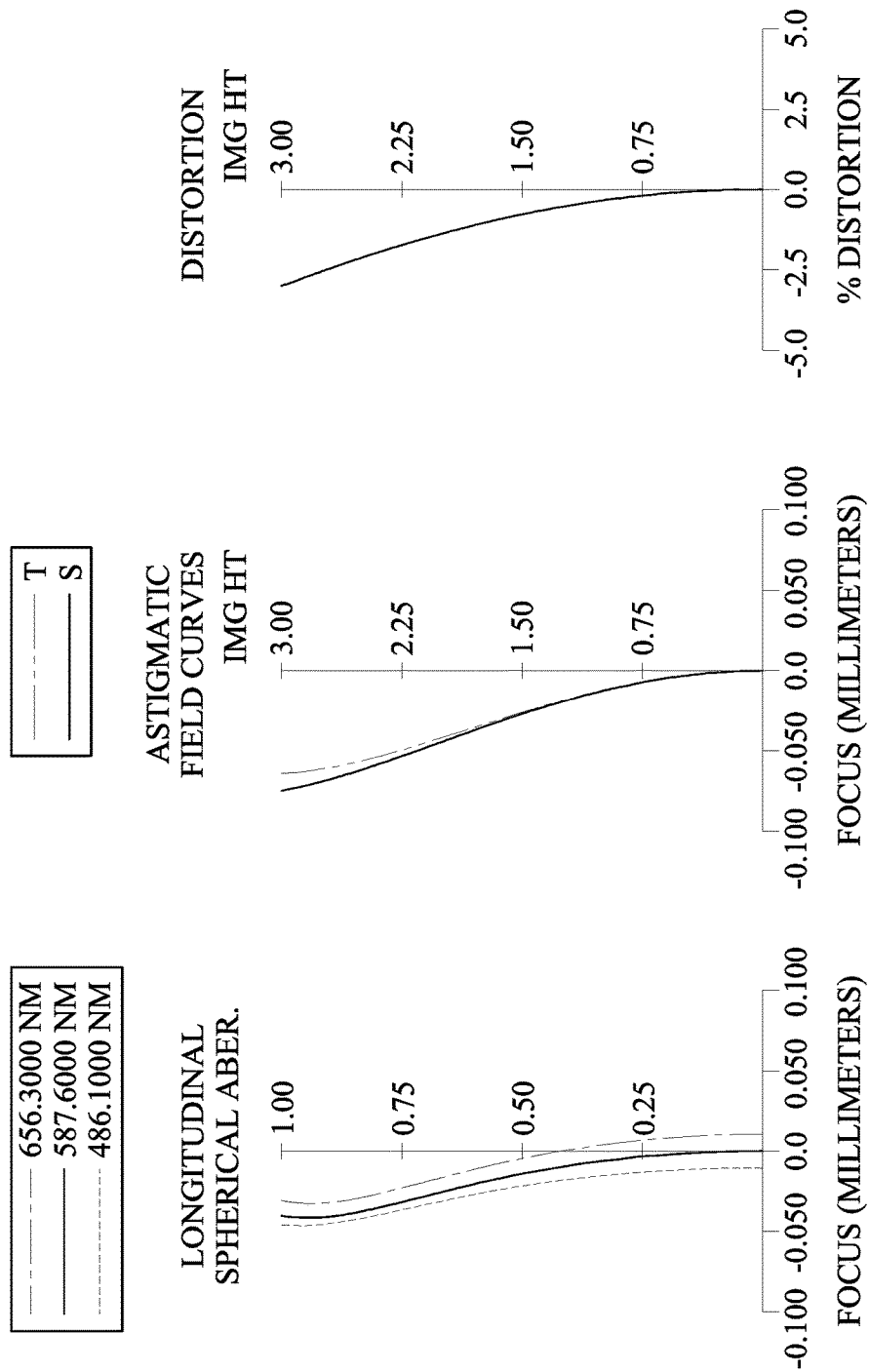
FIG. 24 shows spherical aberration curves, astigmatic field curves and a distortion curve of the image capturing unit according to the 12th embodiment.

FIG. 23 is a schematic view of an image capturing unit according to the 12th embodiment of the present disclosure. FIG. 24 shows, in order from left to right, spherical aberration curves, astigmatic field curves and a distortion curve of the image capturing unit according to the 12th embodiment. In FIG. 23, the image capturing unit includes the imaging lens assembly (its reference numeral is omitted) of the present disclosure and an image sensor 1290. The imaging lens assembly includes, in order from an object side to an image side, a first lens element 1210, a second lens element 1220, an aperture stop 1200, a third lens element 1230, a fourth lens element 1240, a fifth lens element 1250, a sixth lens element 1260, an IR-cut filter 1270, a cover glass 1275 and an image surface 1280, wherein the imaging lens assembly has a total of six lens elements (1210-1260). The first lens element 1210, the second lens element 1220, the third lens element 1230 and the fourth lens element 1240 are single and non-cemented lens elements. The fifth lens element 1250 and the sixth lens element 1260 are cemented lens elements.

The first lens element 1210 with negative refractive power has a convex object-side surface 1211 and a concave image-side surface 1212. The first lens element 1210 is made of glass material and has the object-side surface 1211 and the image-side surface 1212 being both spherical.

The second lens element 1220 with positive refractive power has a convex object-side surface 1221 and a convex image-side surface 1222. The second lens element 1220 is made of glass material and has the object-side surface 1221 and the image-side surface 1222 being both spherical.

The third lens element 1230 with positive refractive power has a convex object-side surface 1231 and a concave image-side surface 1232. The third lens element 1230 is made of glass material and has the object-side surface 1231 and the image-side surface 1232 being both spherical.

The fourth lens element 1240 with positive refractive power has a concave object-side surface 1241 and a convex image-side surface 1242. The fourth lens element 1240 is made of glass material and has the object-side surface 1241 and the image-side surface 1242 being both spherical.

The fifth lens element 1250 with positive refractive power has a convex object-side surface 1251 and a convex image-side surface 1252. The fifth lens element 1250 is made of glass material and has the object-side surface 1251 and the image-side surface 1252 being both spherical.

The sixth lens element 1260 with negative refractive power has a concave object-side surface 1261 and a concave image-side surface 1262. The sixth lens element 1260 is made of glass material and has the object-side surface 1261 and the image-side surface 1262 being both spherical.

The IR-cut filter 1270 and the cover glass 1275 are made of glass material and located between the sixth lens element 1260 and the image surface 1280, and will not affect the focal length of the imaging lens assembly. The image sensor 1290 is disposed on or near the image surface 1280 of the imaging lens assembly.

The detailed optical data of the 12th embodiment are shown in Table 20 below.

TABLE 20

11th Embodiment
f = 7.91 mm, Fno = 1.65, HFOV = 21.4 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 18.008 | 0.750 | Glass | 1.606 | 43.7 | −10.45 |
| 2 | | 4.609 | 1.085 | | | | |

TABLE 20-continued

11th Embodiment
f = 7.91 mm, Fno = 1.65, HFOV = 21.4 deg.

| Surface # | | Curvature Radius | Thickness | Material | Index | Abbe # | Focal Length |
|---|---|---|---|---|---|---|---|
| 3 | Lens 2 | 24.811 | 1.330 | Glass | 1.804 | 46.6 | 16.04 |
| 4 | | −26.226 | 0.700 | | | | |
| 5 | Ape. Stop | Plano | −0.605 | | | | |
| 6 | Lens 3 | 6.227 | 3.420 | Glass | 1.804 | 46.6 | 37.95 |
| 7 | | 5.909 | 1.045 | | | | |
| 8 | Lens 4 | −13.187 | 2.550 | Glass | 1.741 | 52.6 | 10.92 |
| 9 | | −5.426 | 0.100 | | | | |
| 10 | Lens 5 | 11.388 | 3.580 | Glass | 1.804 | 46.6 | 5.10 |
| 11 | | −5.501 | 0.010 | Cement | 1.514 | 38.8 | |
| 12 | Lens 6 | −5.499 | 3.800 | Glass | 1.847 | 23.8 | −4.57 |
| 13 | | 17.246 | 1.000 | | | | |
| 14 | IR-cut filter | Plano | 0.300 | Glass | 1.517 | 64.2 | — |
| 15 | | Plano | 0.300 | | | | |
| 16 | Cover glass | Plano | 0.400 | Glass | 1.517 | 64.2 | — |
| 17 | | Plano | 1.220 | | | | |
| 18 | Image | Plano | — | | | | |

Note:
Reference wavelength is 587.6 nm (d-line).

In the 12th embodiment, the definitions of these parameters shown in the following table are the same as those stated in the 1st embodiment with corresponding values for the 12th embodiment, so an explanation in this regard will not be provided again.

Moreover, these parameters can be calculated from Table 20 as the following values and satisfy the following conditions:

| 12th Embodiment | | | |
|---|---|---|---|
| f [mm] | 7.91 | (CT5 + CT6)/(CT1 + CT2 + CT3 + CT4) | 0.92 |
| Fno | 1.65 | (R5 − R6)/(R5 + R6) | 0.03 |
| HFOV [deg.] | 21.4 | ((R9 + R10)/(R9 − R10)) + ((R11 + R12)/(R11 − R12)) | −0.17 |
| V1 | 43.7 | (|P1| + |P2|)/(|P5| + |P6|) | 0.38 |
| V2 | 46.6 | Y11/Y62 | 1.19 |
| V3 | 46.6 | f/EPD | 1.65 |
| V4 | 52.6 | fr/ff | −0.20 |
| V5 | 46.6 | TL/f | 2.65 |
| V6 | 23.8 | ΣCT/Td | 0.87 |
| Nmax | 1.847 | Td/ImgH | 5.92 |
| T12/T34 | 1.04 | EPD/ImgH | 1.60 |
| f/R12 | 0.46 | tan(2*HFOV) | 0.93 |

The foregoing description, for the purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens assembly comprising six lens elements, the six lens elements being, in order from an object side to an image side:

a first lens element with negative refractive power having an image-side surface being concave in a paraxial region thereof;

a second lens element with positive refractive power having an image-side surface being convex in a paraxial region thereof;

a third lens element having an object-side surface being convex in a paraxial region thereof and an image-side surface being concave in a paraxial region thereof;

a fourth lens element;

a fifth lens element with positive refractive power having an object-side surface being convex in a paraxial region thereof; and a sixth lens element with negative refractive power having an image-side surface being concave in a paraxial region thereof;

wherein the imaging lens assembly has a total of six lens elements, an absolute value of a curvature radius of an object-side surface of the sixth lens element is larger than an absolute value of a curvature radius of the image-side surface of the sixth lens element, an axial distance between the first lens element and the second lens element is larger than an axial distance between the third lens element and the fourth lens element, a sum of central thicknesses of the six lens elements of the imaging lens assembly is ΣCT, an axial distance between an object-side surface of the first lens element and the image-side surface of the sixth lens element is Td, an Abbe number of the sixth lens element is V6, and the following conditions are satisfied:

$0.60 < \Sigma CT/Td < 1.0$; and $V6 < 30$.

2. The imaging lens assembly of claim 1, wherein the object-side surface of the first lens element is concave in a paraxial region thereof.

3. The imaging lens assembly of claim 1, wherein the second lens element has an object-side surface being convex in a paraxial region thereof.

4. The imaging lens assembly of claim 1, wherein the fifth lens element has an image-side surface being convex in a paraxial region thereof.

5. The imaging lens assembly of claim 1, wherein a focal length of the imaging lens assembly is f, an entrance pupil diameter of the imaging lens assembly is EPD, and the following condition is satisfied:

$$f/EPD<1.85.$$

6. The imaging lens assembly of claim 1, wherein each of the six lens elements of the imaging lens assembly is made of plastic material, each surface of the six lens elements of the imaging lens assembly is aspheric, a focal length of the imaging lens assembly is f, the curvature radius of the image-side surface of the sixth lens element is R12, and the following condition is satisfied:

$$0<f/R12<3.0.$$

7. The imaging lens assembly of claim 1, wherein the Abbe number of the sixth lens element is V6, and the following condition is satisfied:

$$V6<20.4.$$

8. The imaging lens assembly of claim 1, wherein an Abbe number of the first lens element is V1, an Abbe number of the second lens element is V2, an Abbe number of the fourth lens element is V4, an Abbe number of the fifth lens element is V5, and the following conditions are satisfied:

$$30<V1;$$

$$30<V2;$$

$$30<V4; \text{ and}$$

$$30<V5.$$

9. The imaging lens assembly of claim 1, wherein a maximum effective radius of the object-side surface of the first lens element is Y11, a maximum effective radius of the image-side surface of the sixth lens element is Y62, and the following condition is satisfied:

$$0.80<Y11/Y62<1.55.$$

10. The imaging lens assembly of claim 1, wherein an absolute value of a curvature radius of an object-side surface of the second lens element is larger than an absolute value of a curvature radius of the image-side surface of the second lens element.

11. An image capturing unit, comprising:
the imaging lens assembly of claim 1; and
an image sensor disposed on the image side of the imaging lens assembly.

12. An electronic device, comprising:
the image capturing unit of claim 11; and
a control unit.

13. An imaging lens assembly comprising six lens elements, the six lens elements being, in order from an object side to an image side:
a first lens element with negative refractive power having an image-side surface being concave in a paraxial region thereof;
a second lens element with positive refractive power having an image-side surface being convex in a paraxial region thereof;
a third lens element having an object-side surface being convex in a paraxial region thereof and an image-side surface being concave in a paraxial region thereof;
a fourth lens element with positive refractive power having an image-side surface being convex in a paraxial region thereof;
a fifth lens element with positive refractive power having an object-side surface being convex in a paraxial region thereof; and
a sixth lens element with negative refractive power having an image-side surface being concave in a paraxial region thereof;
wherein the imaging lens assembly has a total of six lens elements, an absolute value of a curvature radius of an object-side surface of the sixth lens element is larger than an absolute value of a curvature radius of the image-side surface of the sixth lens element, a sum of central thicknesses of the six lens elements of the imaging lens assembly is ΣCT, an axial distance between an object-side surface of the first lens element and the image-side surface of the sixth lens element is Td, and the following condition is satisfied:

$$0.60<\Sigma CT/Td<1.0.$$

14. The imaging lens assembly of claim 13, wherein the object-side surface of the first lens element is concave in a paraxial region thereof, and each of the first lens element, the second lens element, the third lens element and the fourth lens element is a single and non-cemented lens element.

15. The imaging lens assembly of claim 13, wherein the second lens element has an object-side surface being convex in a paraxial region thereof.

16. The imaging lens assembly of claim 13, wherein the sum of central thicknesses of the six lens elements of the imaging lens assembly is ΣCT, the axial distance between the object-side surface of the first lens element and the image-side surface of the sixth lens element is Td, and the following condition is satisfied:

$$0.70\leq\Sigma CT/Td<1.0.$$

17. The imaging lens assembly of claim 13, wherein each surface of the six lens elements of the imaging lens assembly is aspheric, a focal length of the imaging lens assembly is f, the curvature radius of the image-side surface of the sixth lens element is R12, and the following condition is satisfied:

$$0<f/R12<3.0.$$

18. The imaging lens assembly of claim 13, wherein each of the six lens elements of the imaging lens assembly is made of plastic material, an axial distance between the object-side surface of the first lens element and an image surface is TL, a focal length of the imaging lens assembly is f, and the following condition is satisfied:

$$1.8<TL/f<7.0.$$

19. The imaging lens assembly of claim 13, wherein an Abbe number of the first lens element is V1, an Abbe number of the second lens element is V2, an Abbe number of the fourth lens element is V4, an Abbe number of the fifth lens element is V5, and the following conditions are satisfied:

$$30<V1;$$

$$30<V2;$$

$$30<V4; \text{ and}$$

$$30<V5.$$

20. The imaging lens assembly of claim 13, wherein a maximum effective radius of the object-side surface of the first lens element is Y11, a maximum effective radius of the image-side surface of the sixth lens element is Y62, and the following condition is satisfied:

$$0.80<Y11/Y62<1.55.$$

21. An imaging lens assembly comprising six lens elements, the six lens elements being, in order from an object side to an image side:
- a first lens element with negative refractive power having an image-side surface being concave in a paraxial region thereof;
- a second lens element with positive refractive power having an image-side surface being convex in a paraxial region thereof;
- a third lens element having an image-side surface being concave in a paraxial region thereof;
- a fourth lens element;
- a fifth lens element with positive refractive power having an object-side surface being convex in a paraxial region thereof, and both the object-side surface and an image-side surface of the fifth lens element being aspheric; and
- a sixth lens element with negative refractive power having an image-side surface being concave in a paraxial region thereof, and both an object-side surface and the image-side surface of the sixth lens element being aspheric;
- wherein the imaging lens assembly has a total of six lens elements, an absolute value of a curvature radius of the object-side surface of the fifth lens element is smaller than an absolute value of a curvature radius of the image-side surface of the fifth lens element, and an absolute value of a curvature radius of the object-side surface of the sixth lens element is larger than an absolute value of a curvature radius of the image-side surface of the sixth lens element;
- wherein each of the six lens elements of the imaging lens assembly is a single and non-cemented lens element, a sum of central thicknesses of the six lens elements of the imaging lens assembly is $\Sigma CT$, an axial distance between an object-side surface of the first lens element and the image-side surface of the sixth lens element is Td, and the following condition is satisfied:

$0.60<\Sigma CT/Td<1.0$.

22. The imaging lens assembly of claim 21, wherein the object-side surface of the first lens element is concave in a paraxial region thereof.

23. The imaging lens assembly of claim 21, wherein the third lens element has an object-side surface being convex in a paraxial region thereof.

24. The imaging lens assembly of claim 21, wherein the second lens element has an object-side surface being convex in a paraxial region thereof, and each surface of the first lens element, the second lens element, the third lens element and the fourth lens element is aspheric.

25. The imaging lens assembly of claim 21, wherein the image-side surface of the fifth lens element is convex in a paraxial region thereof.

26. The imaging lens assembly of claim 21, wherein an Abbe number of the first lens element is V1, an Abbe number of the second lens element is V2, an Abbe number of the fourth lens element is V4, an Abbe number of the fifth lens element is V5, and the following conditions are satisfied:

$30<V1$;

$30<V2$;

$30<V4$; and $30<V5$.

27. The imaging lens assembly of claim 21, wherein each of the six lens elements of the imaging lens assembly is made of plastic material, an axial distance between the object-side surface of the first lens element and an image surface is TL, a focal length of the imaging lens assembly is f, and the following condition is satisfied:

$1.8<TL/f\leq 3.29$.

28. The imaging lens assembly of claim 21, wherein a maximum effective radius of the object-side surface of the first lens element is Y11, a maximum effective radius of the image-side surface of the sixth lens element is Y62, and the following condition is satisfied:

$0.80<Y11/Y62<1.55$.

29. The imaging lens assembly of claim 21, wherein an Abbe number of the sixth lens element is V6, and the following condition is satisfied:

$V6<30$.

* * * * *